US012353899B2

(12) United States Patent
Yu et al.

(10) Patent No.: US 12,353,899 B2
(45) Date of Patent: Jul. 8, 2025

(54) SIGNAL PROCESSING DEVICE AND VEHICLE DISPLAY DEVICE COMPRISING SAME

(71) Applicant: LG ELECTRONICS INC., Seoul (KR)

(72) Inventors: Ganghee Yu, Seoul (KR); Kyungjun Shin, Seoul (KR); Soohwan Oh, Seoul (KR); Sangkyeong Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/721,153

(22) PCT Filed: Oct. 21, 2022

(86) PCT No.: PCT/KR2022/016126
§ 371 (c)(1),
(2) Date: Jun. 17, 2024

(87) PCT Pub. No.: WO2024/085283
PCT Pub. Date: Apr. 25, 2024

(65) Prior Publication Data
US 2024/0419469 A1    Dec. 19, 2024

(51) Int. Cl.
*G06F 9/455* (2018.01)
*B60K 35/22* (2024.01)
(52) U.S. Cl.
CPC .......... *G06F 9/45545* (2013.01); *B60K 35/22* (2024.01); *G06F 9/45558* (2013.01); *G06F 2009/45562* (2013.01)
(58) Field of Classification Search
None
See application file for complete search history.

(56) References Cited

U.S. PATENT DOCUMENTS

| 9,654,753 B1* | 5/2017 | Balasubramaniam | H04N 19/436 |
| 11,544,028 B2* | 1/2023 | Mues | H04L 12/44 |
| 2016/0328272 A1* | 11/2016 | Ahmed | G06F 9/4881 |

FOREIGN PATENT DOCUMENTS

| JP | 2017507401 | 3/2017 |
| JP | 2020201761 | 12/2020 |

(Continued)

OTHER PUBLICATIONS

PCT International Application No. PCT/KR2022/016126, International Search Report dated Jun. 28, 2023, 2 pages.

(Continued)

*Primary Examiner* — Wynuel S Aquino
(74) *Attorney, Agent, or Firm* — LEE, HONG, DEGERMAN, KANG & WAIMEY

(57) ABSTRACT

The signal processing device and the vehicle display apparatus including the same according to an embodiment of the present disclosure includes a processor to process a vehicle signal, wherein the processor is configured to execute a server virtual machine and a plurality of guest virtual machines on a hypervisor in the processor, wherein the server virtual machine is configured to transmit processed camera data to a shared memory, a second guest virtual machine is configured to receive the camera data from the shared memory, to generate first data for a first application service based on the camera data and to transmit the first data to the shared memory, and a first guest virtual machine is configured to display an image, synthesized based on the camera data from the shared memory and the first data, on the first display. Accordingly, data processing may be performed efficiently.

20 Claims, 23 Drawing Sheets

(56) References Cited

FOREIGN PATENT DOCUMENTS

| | | |
|---|---|---|
| JP | 2020201762 | 12/2020 |
| KR | 1020200110229 | 9/2020 |
| KR | 1020220139790 | 10/2022 |
| WO | 2022181899 | 9/2022 |

OTHER PUBLICATIONS

Korean Intellectual Property Office Application No. 10-2024-7016325, Office Action dated Oct. 31, 2024, 7 pages.

\* cited by examiner

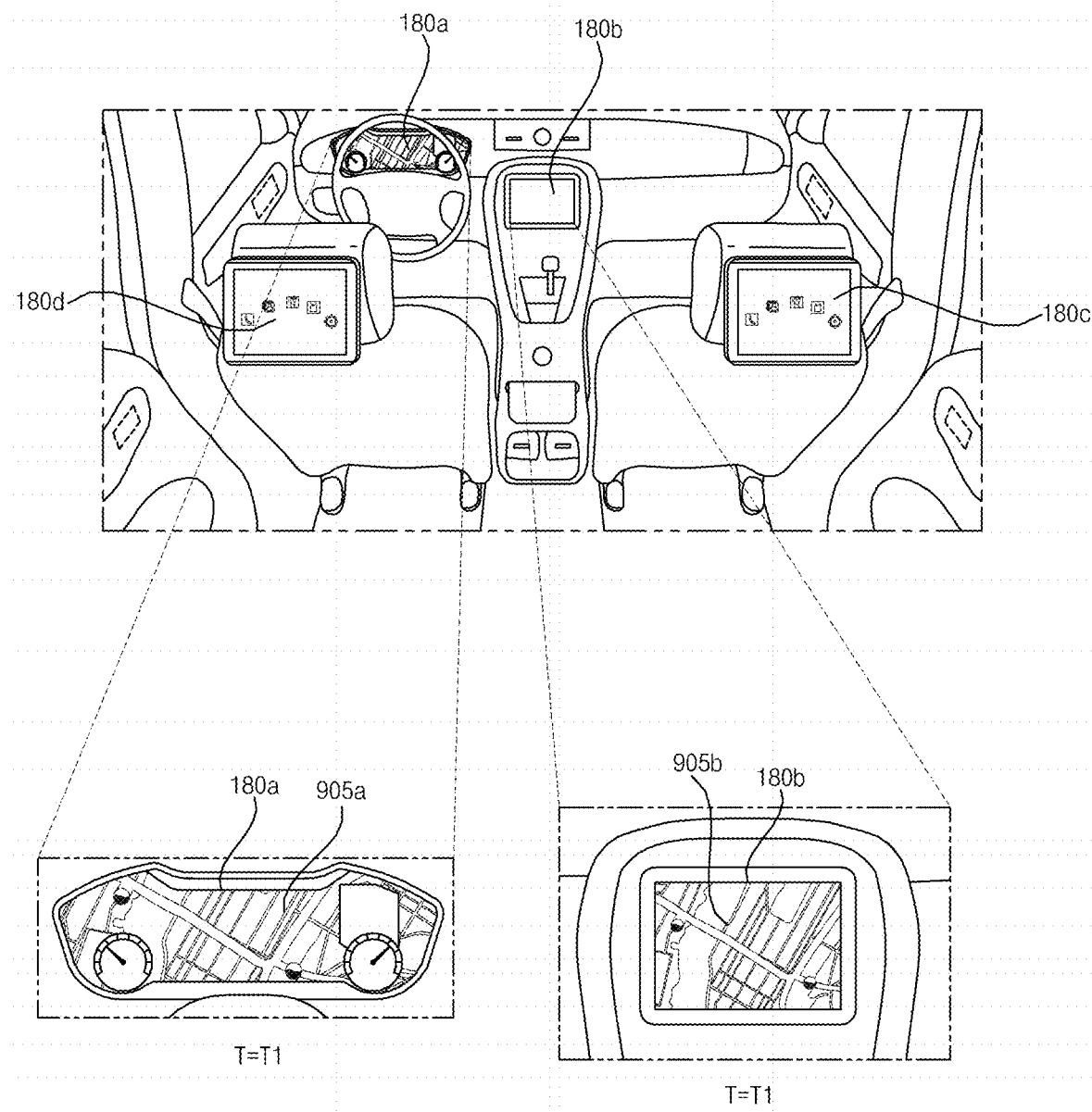

| Camera Operation Category | Object to detect | Application List |
|---|---|---|
| Object Detection | Road | AR HUD |
| | Road Line | AR HUD |
| | Traffic Sign | TSR, POI, Translation |
| | Pedestrian | ADAS |
| | ALL | ADAS |
| | ... | ... |

| Camera Operation Category | Application List |
|---|---|
| Picture Stabilization | ALL Application |
| | |
| | |
| | |
| | |
| | ... |

SIGNAL PROCESSING DEVICE AND VEHICLE DISPLAY DEVICE COMPRISING SAME

CROSS-REFERENCE TO RELATED APPLICATION(S)

This application is the National Stage filing under 35 U.S.C. 371 of International Application No. PCT/KR2022/016126, filed on Oct. 21, 2022, the contents of which are all incorporated by reference herein in its entirety.

BACKGROUND

1. Technical Field

The present disclosure relates to a signal processing device and a vehicle display apparatus including the same, and more particularly to a signal processing device capable of efficiently performing data processing, and a vehicle display apparatus including the signal processing device.

2. Description of the Related Art

A vehicle is a device that allows a user to move in desired directions. A typical example of the vehicle is a car.

Meanwhile, a vehicle display apparatus is mounted in the vehicle for user convenience.

For example, a display mounted on a cluster and the like displays a variety of information. Meanwhile, in order to display vehicle driving information and the like, various displays, such as an Audio Video Navigation (AVN) display, etc., are mounted in the vehicle separately from the cluster.

However, as the number of displays in the vehicle display apparatus increases, a problem occurs in that signal processing for the displays becomes complicated.

SUMMARY

It is an objective of the present disclosure to provide a signal processing device capable of efficiently performing data processing, and a vehicle display apparatus including the signal processing device.

Meanwhile, it is another objective of the present disclosure to provide a signal processing device capable of efficiently performing image data processing based on camera data, and a vehicle display apparatus including the signal processing device.

Meanwhile, it is yet another objective of the present disclosure to provide a signal processing device capable of efficiently performing data processing even when a plurality of virtual machines run on different operating systems, and a vehicle display apparatus including the signal processing device.

In accordance with an aspect of the present disclosure, the above and other objectives can be accomplished by providing a signal processing device including a processor configured to perform signal processing for a plurality of displays located in a vehicle, wherein the processor is configured to execute a server virtual machine and a plurality of guest virtual machines on a hypervisor in the processor, wherein a first guest virtual machine and a second guest virtual machine among the plurality of guest virtual machines are configured to operate for a first display and a second display, respectively, wherein the server virtual machine is configured to process input camera data and transmit the processed camera data to a shared memory set based on the hypervisor, wherein the second guest virtual machine is configured to receive the camera data from the shared memory, to generate first data for a first application service based on the camera data, and to transmit the first data to the shared memory; and the first guest virtual machine is configured to display an image, synthesized based on the camera data from the shared memory and the first data, on the first display.

Meanwhile, the first guest virtual machine may be configured to operate for the first display based on a first operating system, and the second guest virtual machine may be configured to operate for the second display based on a second operating system different from the first operating system.

Meanwhile, the second guest virtual machine may be configured to display a second image, synthesized based on the camera data from the shared memory and the first data, on the second display.

Meanwhile, the first guest virtual machine may be configured to transmit the synthesized image to the shared memory; and the second guest virtual machine may be configured to display the synthesized image from the shared memory on the second display.

Meanwhile, a third guest virtual machine among the plurality of guest virtual machines may be configured to receive the camera data from the shared memory, to generate second data for a second application service based on the camera data, and to transmit the second data to the shared memory, wherein the first guest virtual machine may be configured to display a third image, synthesized based on the camera data from the shared memory and the first data and the second data, on the first display.

Meanwhile, the first guest virtual machine may be configured to operate for the first display based on a first operating system, and the second guest virtual machine may be configured to operate for the second display based on a second operating system different from the first operating system, and the third guest virtual machine may be configured to operate for the third display based on a third operating system different from the first operating system and the second operating system.

Meanwhile, the second guest virtual machine may be configured to display a second image, synthesized based on the camera data from the shared memory and the first data, on the second display; and the third guest virtual machine may be configured to display a fourth image, synthesized based on the camera data from the shared memory and the second data, on the third display.

Meanwhile, the second guest virtual machine may be configured to display a fifth image, synthesized based on the camera data from the shared memory and the first data and the second data, on the second display; and the third guest virtual machine may be configured to display a sixth image, synthesized based on the camera data from the shared memory and the first data and the second data, on the third display.

Meanwhile, the first guest virtual machine may be configured to transmit the synthesized third image to the shared memory, wherein at least one of the second guest virtual machine or the third guest virtual machine may be configured to display the synthesized third image from the shared memory on at least one of the second display or the third display.

Meanwhile, an application manager in the first guest virtual machine or the second guest virtual machine may be configured to transmit an event request to the server virtual machine, wherein the server virtual machine may be configured to transmit sharable camera data among the processed camera data to the shared memory based on the event request.

Meanwhile, the server virtual machine may be configured to execute a data sharing manager for sharing the camera data and a camera processing manager for processing the camera data.

In accordance with another aspect of the present disclosure, there is provided a signal processing device including a processor configured to perform signal processing for a plurality of displays located in a vehicle, wherein the processor is configured to execute a server virtual machine and first and second guest virtual machines that operate on different operating systems on a hypervisor in the processor, wherein a first guest virtual machine and a second guest virtual machine are configured to operate for a first display and a second display, respectively, wherein the server virtual machine is configured to process input data and transmit the processed shared data to a shared memory set based on the hypervisor, wherein the second guest virtual machine is configured to receive the shared data from the shared memory, to generate first data for a first application service, and to transmit the first data to the shared memory; and the first guest virtual machine is configured to output content, synthesized based on the shared data from the shared memory and the first data, to the first display or an audio output device.

Meanwhile, the shared data may include at least one of camera data, radar data, lidar data, audio data, or image data.

Meanwhile, the synthesized content may include at least one of a synthesized image or a synthesized sound.

In accordance with yet another aspect of the present disclosure, there is provided a vehicle display apparatus including: a plurality of displays; and a signal processing device including a processor configured to perform signal processing for the plurality of displays, wherein the processor is configured to execute a server virtual machine and a plurality of guest virtual machines on a hypervisor in the processor, wherein a first guest virtual machine and a second guest virtual machine among the plurality of guest virtual machines are configured to operate for a first display and a second display, respectively, wherein the server virtual machine is configured to process input camera data and transmit the processed camera data to a shared memory set based on the hypervisor, wherein the second guest virtual machine is configured to receive the camera data from the shared memory, to generate first data for a first application service based on the camera data, and to transmit the first data to the shared memory; and the first guest virtual machine is configured to display an image, synthesized based on the camera data from the shared memory and the first data, on the first display.

Effects of the Disclosure

A signal processing device according to an embodiment of the present disclosure includes a processor configured to perform signal processing for a plurality of displays located in a vehicle, wherein the processor is configured to execute a server virtual machine and a plurality of guest virtual machines on a hypervisor in the processor, wherein a first guest virtual machine and a second guest virtual machine among the plurality of guest virtual machines are configured to operate for a first display and a second display, respectively, wherein the server virtual machine is configured to process input camera data and transmit the processed camera data to a shared memory set based on the hypervisor, wherein the second guest virtual machine is configured to receive the camera data from the shared memory, to generate first data for a first application service based on the camera data, and to transmit the first data to the shared memory; and the first guest virtual machine is configured to display an image, synthesized based on the camera data from the shared memory and the first data, on the first display. Accordingly, data processing may be performed efficiently. Particularly, image data processing based on camera data may be performed efficiently.

Meanwhile, the first guest virtual machine may be configured to operate for the first display based on a first operating system, and the second guest virtual machine may be configured to operate for the second display based on a second operating system different from the first operating system. Accordingly, even when the plurality of virtual machines run on different operating systems, image data processing based on camera data may be performed efficiently.

Meanwhile, the second guest virtual machine may be configured to display a second image, synthesized based on the camera data from the shared memory and the first data, on the second display. Accordingly, image data processing based on camera data may be performed efficiently.

Meanwhile, the first guest virtual machine may be configured to transmit the synthesized image to the shared memory; and the second guest virtual machine may be configured to display the synthesized image from the shared memory on the second display. Accordingly, image data processing based on camera data may be performed efficiently.

Meanwhile, a third guest virtual machine among the plurality of guest virtual machines may be configured to receive the camera data from the shared memory, to generate second data for a second application service based on the camera data, and to transmit the second data to the shared memory, wherein the first guest virtual machine may be configured to display a third image, synthesized based on the camera data from the shared memory and the first data and the second data, on the first display. Accordingly, image data processing based on camera data may be performed efficiently.

Meanwhile, the first guest virtual machine may be configured to operate for the first display based on a first operating system, and the second guest virtual machine may be configured to operate for the second display based on a second operating system different from the first operating system, and the third guest virtual machine may be configured to operate for the third display based on a third operating system different from the first operating system and the second operating system. Accordingly, even when the plurality of virtual machines run on different operating systems, image data processing based on camera data may be performed efficiently.

Meanwhile, the second guest virtual machine may be configured to display a second image, synthesized based on the camera data from the shared memory and the first data, on the second display; and the third guest virtual machine may be configured to display a fourth image, synthesized based on the camera data from the shared memory and the second data, on the third display. Accordingly, image data processing based on camera data may be performed efficiently.

Meanwhile, the second guest virtual machine may be configured to display a fifth image, synthesized based on the camera data from the shared memory and the first data and the second data, on the second display; and the third guest virtual machine may be configured to display a sixth image, synthesized based on the camera data from the shared memory and the first data and the second data, on the third display. Accordingly, image data processing based on camera data may be performed efficiently.

Meanwhile, the first guest virtual machine may be configured to transmit the synthesized third image to the shared memory, wherein at least one of the second guest virtual machine or the third guest virtual machine may be configured to display the synthesized third image from the shared memory on at least one of the second display or the third display. Accordingly, image data processing based on camera data may be performed efficiently.

Meanwhile, an application manager in the first guest virtual machine or the second guest virtual machine may be configured to transmit an event request to the server virtual machine, wherein the server virtual machine may be configured to transmit sharable camera data among the processed camera data to the shared memory based on the event request. Accordingly, image data processing based on camera data may be performed efficiently.

Meanwhile, the server virtual machine may be configured to execute a data sharing manager for sharing the camera data and a camera processing manager for processing the camera data. Accordingly, image data processing based on camera data may be performed efficiently.

In accordance with another aspect of the present disclosure, there is provided a signal processing device including a processor configured to perform signal processing for a plurality of displays located in a vehicle, wherein the processor is configured to execute a server virtual machine and first and second guest virtual machines that operate on different operating systems on a hypervisor in the processor, wherein a first guest virtual machine and a second guest virtual machine are configured to operate for a first display and a second display, respectively, wherein the server virtual machine is configured to process input data and transmit the processed shared data to a shared memory set based on the hypervisor, wherein the second guest virtual machine is configured to receive the shared data from the shared memory, to generate first data for a first application service, and to transmit the first data to the shared memory; and the first guest virtual machine is configured to output content, synthesized based on the shared data from the shared memory and the first data, to the first display or an audio output device. Accordingly, data processing may be performed efficiently.

Meanwhile, the shared data may include at least one of camera data, radar data, lidar data, audio data, or image data. Accordingly, data processing may be performed efficiently.

Meanwhile, the synthesized content may include at least one of a synthesized image or a synthesized sound. Accordingly, data processing may be performed efficiently.

In accordance with yet another aspect of the present disclosure, there is provided a vehicle display apparatus including: a plurality of displays; and a signal processing device including a processor configured to perform signal processing for the plurality of displays, wherein the processor is configured to execute a server virtual machine and a plurality of guest virtual machines on a hypervisor in the processor, wherein a first guest virtual machine and a second guest virtual machine among the plurality of guest virtual machines are configured to operate for a first display and a second display, respectively, wherein the server virtual machine is configured to process input camera data and transmit the processed camera data to a shared memory set based on the hypervisor, wherein the second guest virtual machine is configured to receive the camera data from the shared memory, to generate first data for a first application service based on the camera data, and to transmit the first data to the shared memory; and the first guest virtual machine is configured to display an image, synthesized based on the camera data from the shared memory and the first data, on the first display. Accordingly, data processing may be performed efficiently. Particularly, image data processing based on camera data may be performed efficiently.

BRIEF DESCRIPTION OF THE DRAWINGS

FIGS. 11 to 15 are diagrams referred to in the description of FIG. 10.

DETAILED DESCRIPTION

Hereinafter, the present disclosure will be described in detail with reference to the accompanying drawings.

With respect to constituent elements used in the following description, suffixes "module" and "unit" are given only in consideration of ease in preparation of the specification, and do not have or serve different meanings. Accordingly, the suffixes "module" and "unit" may be used interchangeably.

Figure 1A:
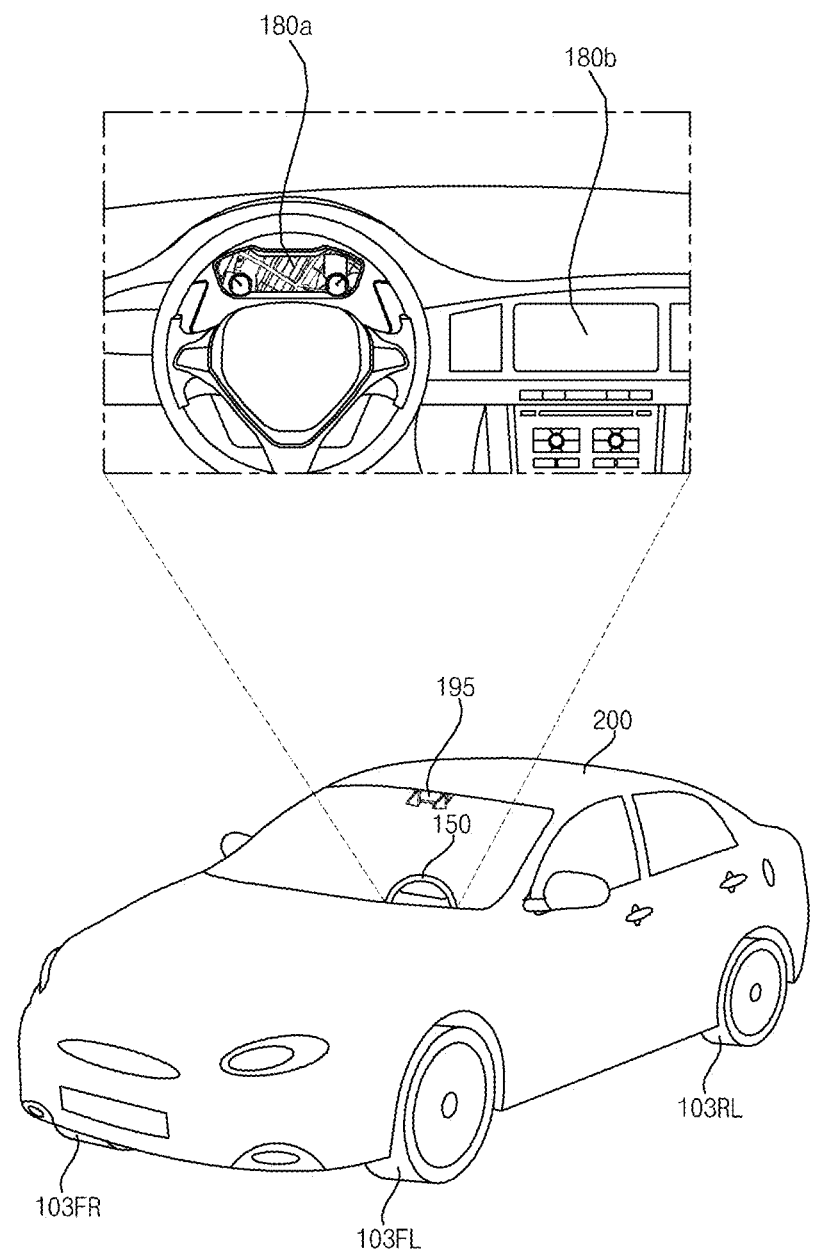
FIG. 1A is a view showing an example of the exterior and interior of a vehicle.

FIG. 1A is a view showing an example of the exterior and interior of a vehicle.

Referring to the figure, the vehicle 200 is moved by a plurality of wheels 103FR, 103FL, 103RL, . . . rotated by a power source and a steering wheel 150 configured to adjust an advancing direction of the vehicle 200.

Meanwhile, the vehicle 200 may be provided with a camera 195 configured to acquire an image of the front of the vehicle.

Meanwhile, the vehicle 200 may be further provided therein with a plurality of displays 180a and 180b configured to display images and information.

In FIG. 1A, a cluster display 180a and an audio video navigation (AVN) display 180b are illustrated as the plurality of displays 180a and 180b. In addition, a head up display (HUD) may also be used.

Meanwhile, the audio video navigation (AVN) display 180*b* may also be called a center information display.

The embodiment of the present disclosure proposes a scheme for dividing data processing in a vehicle display apparatus 100 including a plurality of displays 180*a* and 180*b*, which will be described later with reference to FIG. 12 and subsequent figures.

Meanwhile, the vehicle 200 described in this specification may be a concept including all of a vehicle having an engine as a power source, a hybrid vehicle having an engine and an electric motor as a power source, and an electric vehicle having an electric motor as a power source.

Figure 1B:
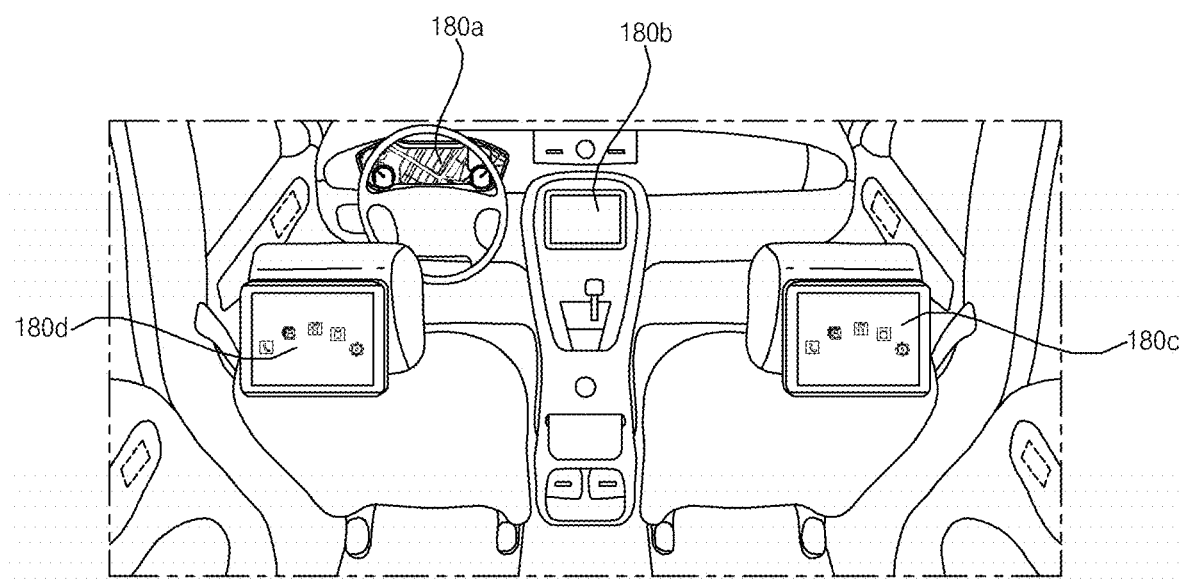
FIG. 1B is a view showing another example of the interior of the vehicle.

FIG. 1B is a view showing another example of the interior of the vehicle.

Referring to the figure, a cluster display 180*a*, an audio video navigation (AVN) display 180*b*, rear seat entertainment displays 180*c* and 180*d*, and a rear-view mirror display (not shown) may be located in the vehicle 200.

The embodiment of the present disclosure proposes a scheme for efficiently performing data processing in a vehicle display apparatus 100 including a plurality of displays 180*a* and 180*b*, which will be described later with reference to FIG. 5 and subsequent figures.

Figure 2:
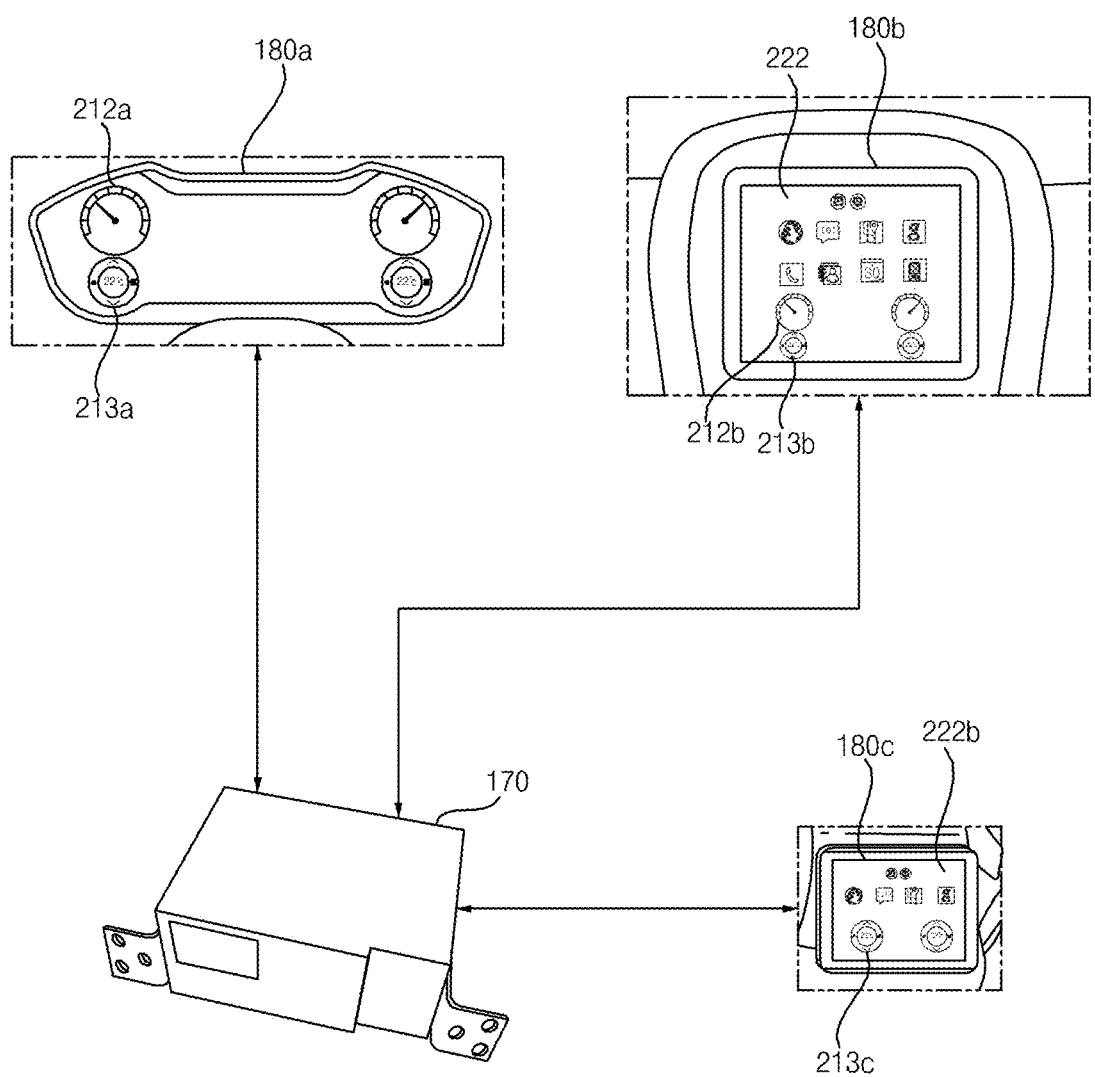
FIG. 2 is a view showing the external appearance of a display apparatus for vehicles according to an embodiment of the present disclosure.

FIG. 2 is a view showing the external appearance of a display apparatus for vehicles according to an embodiment of the present disclosure.

The display apparatus 100 for vehicles according to the embodiment of the present disclosure may include a plurality of displays 180*a* and 180*b* and a signal processing device 170 configured to perform signal processing in order to display images and information on the plurality of displays 180*a* and 180*b*.

The first display 180*a*, which is one of the plurality of displays 180*a* and 180*b*, may be a cluster display 180*a* configured to display a driving state and operation information, and the second display 180*b* may be an audio video navigation (AVN) display 180*b* configured to display vehicle driving information, a navigation map, various kinds of entertainment information, or an image.

The signal processing device 170 may have a processor 175 provided therein, and first to third virtual machines 520 to 540 may be executed by a hypervisor 505 in the processor 175.

The second virtual machine 530 may be operated for the first display 180*a*, and the third virtual machine 540 may be operated for the second display 180*b*.

Meanwhile, the first virtual machine 520 in the processor 175 may perform control such that a shared memory 508 based on the hypervisor 505 is set for transmission of the same data to the second virtual machine 530 and the third virtual machine 540. Consequently, the first display 180*a* and the second display 180*b* in the vehicle may display the same information or the same images in a synchronized state.

Meanwhile, the first virtual machine 520 in the processor 175 shares at least some of data with the second virtual machine 530 and the third virtual machine 540 for divided processing of data. Consequently, the plurality of virtual machines for the plurality of displays in the vehicle may divide and process data.

Meanwhile, the first virtual machine 520 in the processor 175 may receive and process wheel speed sensor data of the vehicle, and may transmit the processed wheel speed sensor data to at least one of the second virtual machine 530 or the third virtual machine 540. Consequently, at least one virtual machine may share the wheel speed sensor data of the vehicle.

Meanwhile, the display apparatus 100 for vehicles according to the embodiment of the present disclosure may further include a rear seat entertainment (RSE) display 180*c* configured to display driving state information, simple navigation information, various kinds of entertainment information, or an image.

The signal processing device 170 may further execute a fourth virtual machine (not shown), in addition to the first to third virtual machines 520 to 540, on the hypervisor 505 in the processor 175 to control the RSE display 180*c*.

Consequently, it is possible to control various displays 180*a* to 180*c* using a single signal processing device 170.

Meanwhile, some of the plurality of displays 180*a* to 180*c* may be operated based on a Linux Operating System (OS), and others may be operated based on a Web Operating System (OS).

When touch is input to any one of the displays 180*a* and 180*b* or 180*a* to 180*c* configured to be operated under various operating systems, the signal processing device 170 according to the embodiment of the present disclosure may perform control such that the touch input is rapidly and accurately processed.

Meanwhile, FIG. 2 illustrates that a vehicle speed indicator 212*a* and an in-vehicle temperature indicator 213*a* are displayed on the first display 180*a*, a home screen 222 including a plurality of applications, a vehicle speed indicator 212*b*, and an in-vehicle temperature indicator 213*b* is displayed on the second display 180*b*, and a home screen 222*b* including a plurality of applications and an in-vehicle temperature indicator 213*c* is displayed on the third display 180*c*.

Figure 3:
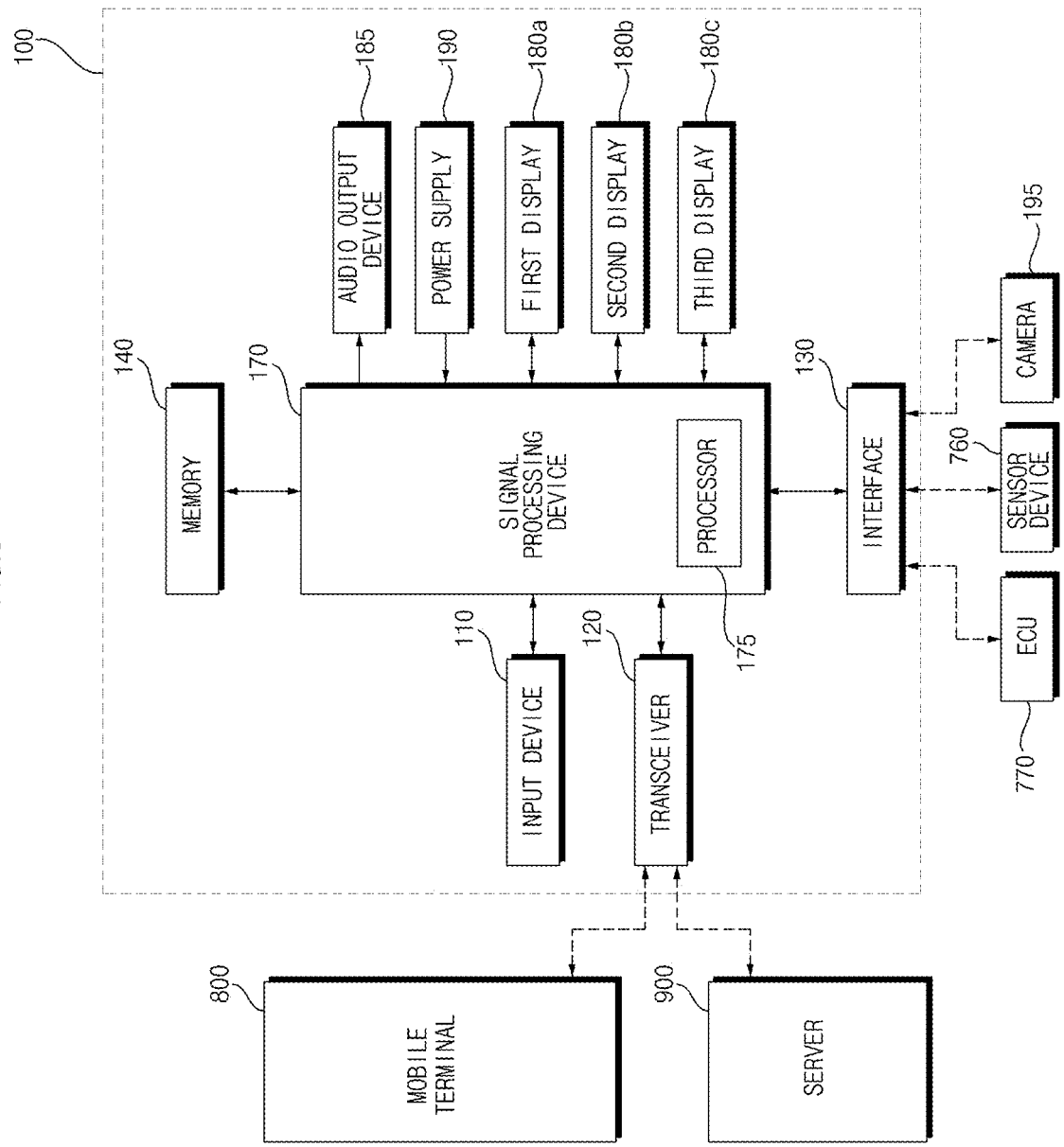
FIG. 3 illustrates an example of an internal block diagram of the display apparatus for vehicles of FIG. 2.

FIG. 3 illustrates an example of an internal block diagram of the display apparatus for vehicles according to the embodiment of the present disclosure.

Referring to the figure, the display apparatus 100 for vehicles according to the embodiment of the present disclosure may include an input device 110, a transceiver 120, an interface 130, a memory 140, a signal processing device 170, a plurality of displays 180*a* to 180*c*, an audio output device 185, and a power supply 190.

The input device 110 may include a physical button or pad for button input or touch input.

Meanwhile, the input device 110 may include a touch sensor (not shown) configured to sense touch input to the displays 180*a*, 180*b*, and 180*c*.

Meanwhile, the input device 110 may include a microphone (not shown) for user voice input.

The transceiver 120 may wirelessly exchange data with a mobile terminal 800 or a server 900.

In particular, the transceiver 120 may wirelessly exchange data with a mobile terminal 800 of a vehicle driver. Any of various data communication schemes, such as Bluetooth, Wi-Fi, WIFI Direct, and APIX, may be used as a wireless data communication scheme.

The transceiver 120 may receive weather information and road traffic situation information, such as transport protocol expert group (TPEG) information, from the mobile terminal 800 or the server 900. To this end, the transceiver 120 may include a mobile communication module (not shown).

The interface 130 may receive sensor information from an electronic control unit (ECU) 770 or a sensor device 760, and may transmit the received information to the signal processing device 170.

Here, the sensor information may include at least one of vehicle direction information, vehicle position information (global positioning system (GPS) information), vehicle angle information, vehicle velocity information, vehicle acceleration information, vehicle inclination information, vehicle forward/backward movement information, battery information, fuel information, tire information, vehicle lamp information, in-vehicle temperature information, or in-vehicle humidity information.

The sensor information may be acquired from a heading sensor, a yaw sensor, a gyro sensor, a position sensor, a vehicle forward/backward movement sensor, a wheel sensor, a vehicle velocity sensor, a car body inclination sensor, a battery sensor, a fuel sensor, a tire sensor, a steering-wheel-rotation-based steering sensor, an in-vehicle temperature sensor, or an in-vehicle humidity sensor. Meanwhile, the position module may include a GPS module configured to receive GPS information.

Meanwhile, the interface 130 may receive front-of-vehicle image data, side-of-vehicle image data, rear-of-vehicle image data, and obstacle-around-vehicle distance information from a camera 195 or lidar (not shown) and may transmit the received information to the signal processing device 170.

The memory 140 may store various data for overall operation of the vehicle display apparatus 100, including programs for processing or control of the signal processing device 170.

For example, the memory 140 may store data about the hypervisor and the first to third virtual machines executed in the processor 175.

The audio output device 185 may convert an electrical signal from the signal processing device 170 into an audio signal, and may output the audio signal. To this end, the audio output device 185 may include a speaker.

The power supply 190 may supply power necessary to operate components under control of the signal processing device 170. In particular, the power supply 190 may receive power from a battery in the vehicle.

The signal processing device 170 may control overall operation of each device in the display apparatus 100 for vehicles.

For example, the signal processing device 170 may include a processor 175 for performing signal processing for the vehicle displays 180a and 180b.

The processor 175 may execute the first to third virtual machines 520 to 540 on the hypervisor 505 (see FIG. 5) in the processor 175.

Meanwhile, the processor 175 may further execute a legacy virtual machine configured to receive and process Ethernet data. For example, as shown in FIG. 5, the legacy virtual machine 510 may be executed by the first virtual machine 520 in the processor 175.

Among the first to third virtual machines 520 to 540 (see FIG. 5), the first virtual machine 520 may be called a server virtual machine, and the second and third virtual machines 530 and 540 may be called guest virtual machines.

In this case, the second virtual machine 530 may be operated for the first display 180a, and the third virtual machine 540 may be operated for the second display 180b.

For example, the first virtual machine 520 in the processor 175 may receive, process, and output vehicle sensor data, position information data, camera image data, audio data, or touch input data. Data processed only by a legacy virtual machine and data processed by the first virtual machine 520 may be distinguished from each other, whereby data processing may be efficiently performed. In particular, the first virtual machine 520 may process most of the data, whereby 1:N data sharing may be achieved.

As another example, the first virtual machine 520 may directly receive and process CAN communication data, audio data, radio data, USB data, and wireless communication data for the second and third virtual machines 530 and 540.

The first virtual machine 520 may transmit the processed data to the second and third virtual machines 530 and 540.

Consequently, only the first virtual machine 520, among the first to third virtual machines 520 to 540, may receive communication data and external input data, and may perform signal processing, whereby load in signal processing by the other virtual machines may be reduced and 1:N data communication may be achieved, and therefore synchronization at the time of data sharing may be achieved.

Meanwhile, the first virtual machine 520 writes some of data in a first shared memory (not shown) so as to be transmitted to the second virtual machine 530 and writes some other of data in the first shared memory (not shown) so as to be transmitted to the third virtual machine 540. The second virtual machine 530 and the third virtual machine 540 may be configured to process the received data and write the processed data in a second shared memory (not shown). Accordingly, data processing may be performed efficiently.

At this time, data may be any one of image data, audio data, navigation data, and voice recognition data.

Meanwhile, the first virtual machine 520 may process some other of data, and may be configured to write the processed data in the second shared memory (not shown). That is, the first virtual machine 520 may perform data processing in addition to the second virtual machine 530 and the third virtual machine 540.

Meanwhile, in response to a fourth virtual machine 550 configured to be operated for the third display 180c being executed in the processor 175, the first virtual machine 520 may write some other of data in the first shared memory (not shown), and the fourth virtual machine 550 may process the received data and may be configured to write the processed data in the second shared memory (not shown).

Meanwhile, the first virtual machine 520 may generate command queues for distributed processing of data in the second virtual machine 530 and the third virtual machine 540. Consequently, the plurality of virtual machines may divide and process data.

Meanwhile, in response to the second virtual machine 530 and the third virtual machine 540 sharing the same data, the first virtual machine 520 in the processor 175 may generate one command queue. Consequently, the same data may be synchronized and shared.

Meanwhile, the first virtual machine 520 may generate command queues corresponding to the number of virtual machines for distributed processing of data.

Meanwhile, the first virtual machine 520 may be configured to transmit at least some of data to at least one of the second virtual machine 530 or the third virtual machine 540 for distributed processing of data.

For example, the first virtual machine 520 may allocate the first shared memory (not shown) for transmitting at least some of data to at least one of the second virtual machine 530 or the third virtual machine 540, and image data processed by the second virtual machine 530 or the third virtual machine 540 may be written in the second shared memory (not shown).

Meanwhile, the first virtual machine 520 may be configured to write data in the shared memory 508, whereby the second virtual machine 530 and the third virtual machine 540 share the same data.

For example, the first virtual machine 520 may be configured to write radio data or wireless communication data in the shared memory 508, whereby the second virtual machine 530 and the third virtual machine 540 share the same data. Consequently, 1:N data sharing may be achieved.

Eventually, the first virtual machine 520 may process most of the data, whereby 1:N data sharing may be achieved.

Meanwhile, the first virtual machine 520 in the processor 175 may be configured to set the shared memory 508 based on the hypervisor 505 in order to transmit the same data to the second virtual machine 530 and the third virtual machine 540.

That is, the first virtual machine 520 in the processor 175 may transmit the same data to the second virtual machine 530 and the third virtual machine 540 in a synchronized state using the shared memory 508 based on the hypervisor 505. Consequently, the plurality of displays 180a and 180b in the vehicle may display the same images in a synchronized state.

Meanwhile, the signal processing device 170 may process various signals, such as an audio signal, an image signal, and a data signal. To this end, the signal processing device 170 may be implemented in the form of a system on chip (SOC).

Figure 4:
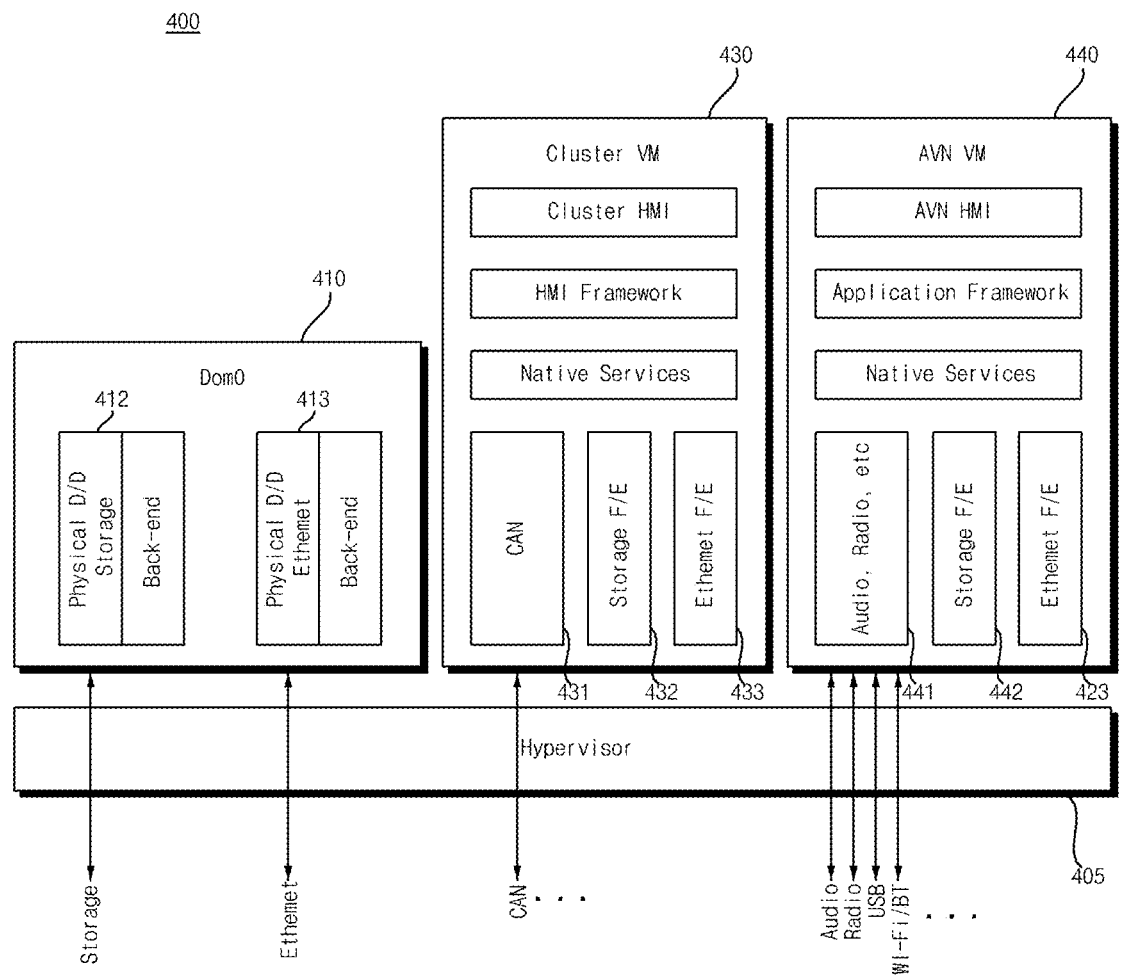
FIG. 4 is a view showing a system executed in a signal processing device according to an embodiment of the present disclosure.

FIG. 4 is a view showing a system executed in a signal processing device according to an embodiment of the present disclosure.

Referring to the figure, FIG. 4 is a view illustrating that virtual machines are used for the cluster display 180a and the AVN display 180b.

The system 400 executed in the signal processing device of FIG. 4 illustrates that a cluster virtual machine 430 and an AVN virtual machine 440 are executed through a hypervisor 405 in the processor 175.

Meanwhile, the system 400 executed in the signal processing device of FIG. 4 illustrates that a legacy virtual machine 410 is also executed on the hypervisor 405 in the processor 175.

The legacy virtual machine 410 may include an interface 412 for data communication with the memory 140 and an interface 413 for Ethernet communication.

Meanwhile, the cluster virtual machine 430 may include an interface 431 for CAN communication, an interface 432 for communication with the interface 412 of the legacy virtual machine 410, and an interface 433 for communication with the interface 413 of the legacy virtual machine 410.

Meanwhile, the AVN virtual machine 440 may include an interface 441 for input and output of audio data, radio data, USB data, and wireless communication data, an interface 442 for communication with the interface 412 of the legacy virtual machine 410, and an interface 443 for communication with the interface 413 of the legacy virtual machine 410.

In the system 400, there is a disadvantage in that CAN communication data are input and output only in the cluster virtual machine 430, whereby the CAN communication data cannot be utilized in the AVN virtual machine 440.

Also, in the system 400 of FIG. 4, there is a disadvantage in that audio data, radio data, USB data, and wireless communication data are input and output only in the AVN virtual machine 440, whereby these data cannot be utilized in the cluster virtual machine 430.

Meanwhile, there is a disadvantage in that the cluster virtual machine 430 and the AVN virtual machine 440 must include the interfaces 431 and 432 and the interfaces 441 and 442, respectively, for memory data and Ethernet communication data input and output in the legacy virtual machine 410.

Therefore, the present disclosure proposes a scheme for improving the system of FIG. 4. That is, unlike FIG. 4, virtual machines are classified into a server virtual machine and guest virtual machines for inputting and outputting various memory data and communication data not in the guest virtual machines but in the server virtual machine. This will be described with reference to FIG. 5 and subsequent figures.

Figure 5:
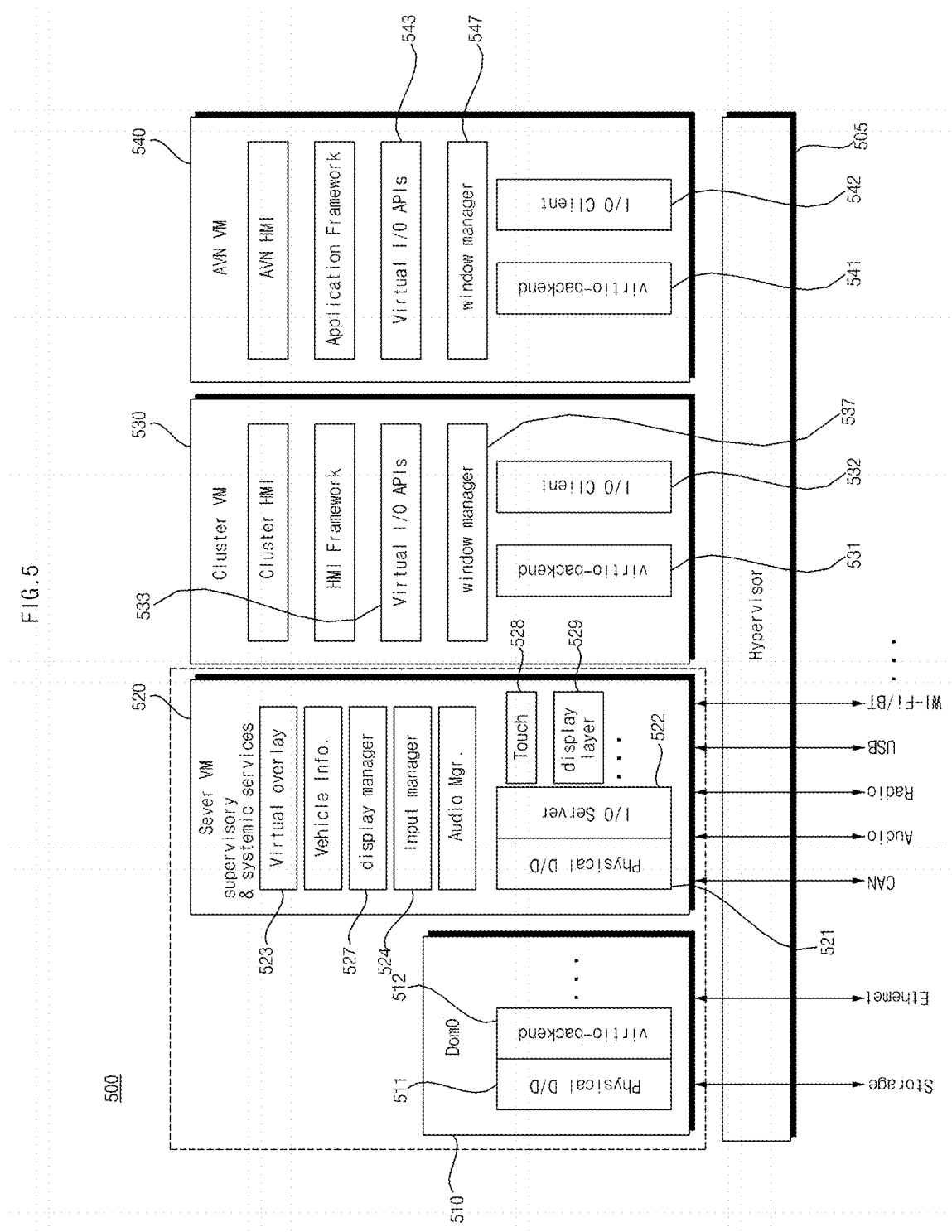
FIG. 5 is a diagram showing an example of a system executed in a signal processing device according to the present disclosure.

FIG. 5 is a diagram showing an example of a system executed in a signal processing device according to the present disclosure.

Referring to the figure, the system 500 of FIG. 5 illustrates that the first virtual machine 520, which is a server virtual machine, the second virtual machine 530, which is a guest virtual machine, and the third virtual machine 540, which is a guest virtual machine, are executed on the hypervisor 505 in the processor 175 of the signal processing device 170.

The second virtual machine 530 may be a virtual machine for the cluster display 180a, and the third virtual machine 540 may be a virtual machine for the AVN display 180b.

That is, the second virtual machine 530 and the third virtual machine 540 may be operated for image rendering of the cluster display 180a and the AVN display 180b, respectively.

Meanwhile, the system 50 executed in the signal processing device 170 of FIG. 5 illustrates that a legacy virtual machine 510 is also executed on the hypervisor 505 in the processor 175.

The legacy virtual machine 510 may include an interface 511 for data communication with the memory 140 and Ethernet communication.

The figure illustrates that the interface 511 is a physical device driver; however, various modifications are possible.

Meanwhile, the legacy virtual machine 510 may further include a virtio-backend interface 512 for data communication with the second and third virtual machines 530 and 540.

The first virtual machine 520 may include an interface 521 for input and output of audio data, radio data, USB data, and wireless communication data and an input and output server interface 522 for data communication with the guest virtual machines.

That is, the first virtual machine 520, which is a server virtual machine, may provide inputs/outputs (I/O) difficult to virtualize with standard virtualization technology (VirtIO) to a plurality of guest virtual machines, such as the second and third virtual machines 530 and 540.

Meanwhile, the first virtual machine 520, which is a server virtual machine, may control radio data and audio data at a supervisor level, and may provide the data to a plurality of guest virtual machines, such as the second and third virtual machines 530 and 540.

Meanwhile, the first virtual machine 520, which is a server virtual machine, may process vehicle data, sensor data, and surroundings-of-vehicle information, and may provide the processed data or information to a plurality of guest virtual machines, such as the second and third virtual machines 530 and 540.

Meanwhile, the first virtual machine 520 may provide supervisory services, such as processing of vehicle data and audio routing management.

Next, the second virtual machine 530 may include an input and output client interface 532 for data communication with the first virtual machine 520 and APIs 533 configured to control the input and output client interface 532.

In addition, the second virtual machine 530 may include a virtio-backend interface for data communication with the legacy virtual machine 510.

The second virtual machine 530 may receive memory data by communication with the memory 140 or Ethernet data by Ethernet communication from the virtio-backend interface 512 of the legacy virtual machine 510 through the virtio-backend interface.

Next, the third virtual machine 540 may include an input and output client interface 542 for data communication with the first virtual machine 520 and APIs 543 configured to control the input and output client interface 542.

In addition, the third virtual machine 540 may include a virtio-backend interface for data communication with the legacy virtual machine 510.

The third virtual machine 540 may receive memory data by communication with the memory 140 or Ethernet data by Ethernet communication from the virtio-backend interface 512 of the legacy virtual machine 510 through the virtio-backend interface.

Meanwhile, the legacy virtual machine 510 may be provided in the first virtual machine 520, unlike FIG. 5.

In the system 500, CAN communication data are input and output only in the first virtual machine 520, but may be provided to a plurality of guest virtual machines, such as the second and third virtual machines 530 and 540, through data processing in the first virtual machine 520. Consequently, 1:N data communication by processing of the first virtual machine 520 may be achieved.

Also, in the system 500 of FIG. 5, audio data, radio data, USB data, and wireless communication data are input and output only in the first virtual machine 520, but may be provided to a plurality of guest virtual machines, such as the second and third virtual machines 530 and 540, through data processing in the first virtual machine 520. Consequently, 1:N data communication by processing of the first virtual machine 520 may be achieved.

Also, in the system 500 of FIG. 5, touch input to the first display 180a or the second display 180b is input only to the first virtual machine 520 and is not input to the second virtual machine 530 and the third virtual machine 540. Information regarding the touch input is transmitted to the second virtual machine 530 or the third virtual machine 540.

Consequently, the touch input may be rapidly and accurately processed. In addition, the touch input may be rapidly and accurately processed even though the number of virtual machines that are executed is increased.

Meanwhile, in the system 500 of FIG. 5, the second and third virtual machines 530 and 540 may be operated based on different operating systems.

For example, the second virtual machine 530 may be operated based on a Linux OS, and the third virtual machine 540 may be operated based on a Web OS.

In the first virtual machine 520, the shared memory 508 based on the hypervisor 505 is set for data sharing, even though the second and third virtual machines 530 and 540 are operated based on different operating systems. Even though the second and third virtual machines 530 and 540 are operated based on different operating systems, therefore, the same data or the same images may be shared in a synchronized state. Eventually, the plurality of displays 180a and 180b may display the same data or the same images in a synchronized state.

Meanwhile, the first virtual machine 520 transmits information regarding the touch input to the second virtual machine 530 or the third virtual machine 540 even though the second and third virtual machines 530 and 540 are operated based on different operating systems. Consequently, the touch input may be rapidly and accurately processed even though the second and third virtual machines 530 and 540 are operated based on different operating systems (OS).

Meanwhile, the first virtual machine 520 may include a display manager 527 configured to control overlays displayed on the first display 180a and the second display 180b through the second and third virtual machines 530 and 540, a display layer server 529, and a virtual overlay generator 523 configured to generate a virtual overlay.

The display layer server 529 may receive a first overlay provided by the second virtual machine 530 and a second overlay provided by the third virtual machine 540.

Meanwhile, the display layer server 529 may transmit a virtual overlay, generated by the virtual overlay generator 523, to at least one of the second virtual machine 530 or the third virtual machine 540.

Meanwhile, the display manager 527 in the first virtual machine 520 may receive the first overlay provided by the second virtual machine 530 and the second overlay provided by the third virtual machine 540 through the display layer server 529.

The display manager 527 in the first virtual machine 520 may be configured to transmit the virtual overlay, which is different from the first overlay or the second overlay, to at least one of the second virtual machine 530 or the third virtual machine 540 through the display layer server 529.

In response thereto, the second virtual machine 530 may perform control such that the first overlay and the virtual overlay are combined and displayed on the first display 180a.

In addition, the third virtual machine 540 may perform control such that the second overlay and the virtual overlay are combined and displayed on the second display 180b.

Meanwhile, the first virtual machine 520 may include an input manager 524 configured to receive an input signal from the outside. At this time, the input signal may be an input signal from a predetermined button (start button) in the vehicle, a touch input signal, or a voice input signal.

For example, the input manager 524 in the first virtual machine 520 may receive touch input from the first display 180a or the second display 180b.

Meanwhile, the first virtual machine 520 may include a touch server 528 configured to transmit information regarding the touch input related to the touch input from the first display 180a or the second display 180b to the second virtual machine 530 or the third virtual machine 540.

For example, in response to touch input corresponding to the first display 180a, the touch server 528 in the first virtual machine 520 may transmit information regarding the touch input to the second virtual machine 530.

Meanwhile, the touch server 528 in the first virtual machine 520 may receive the touch input from the first display 180a or the second display 180b.

Figure 6:
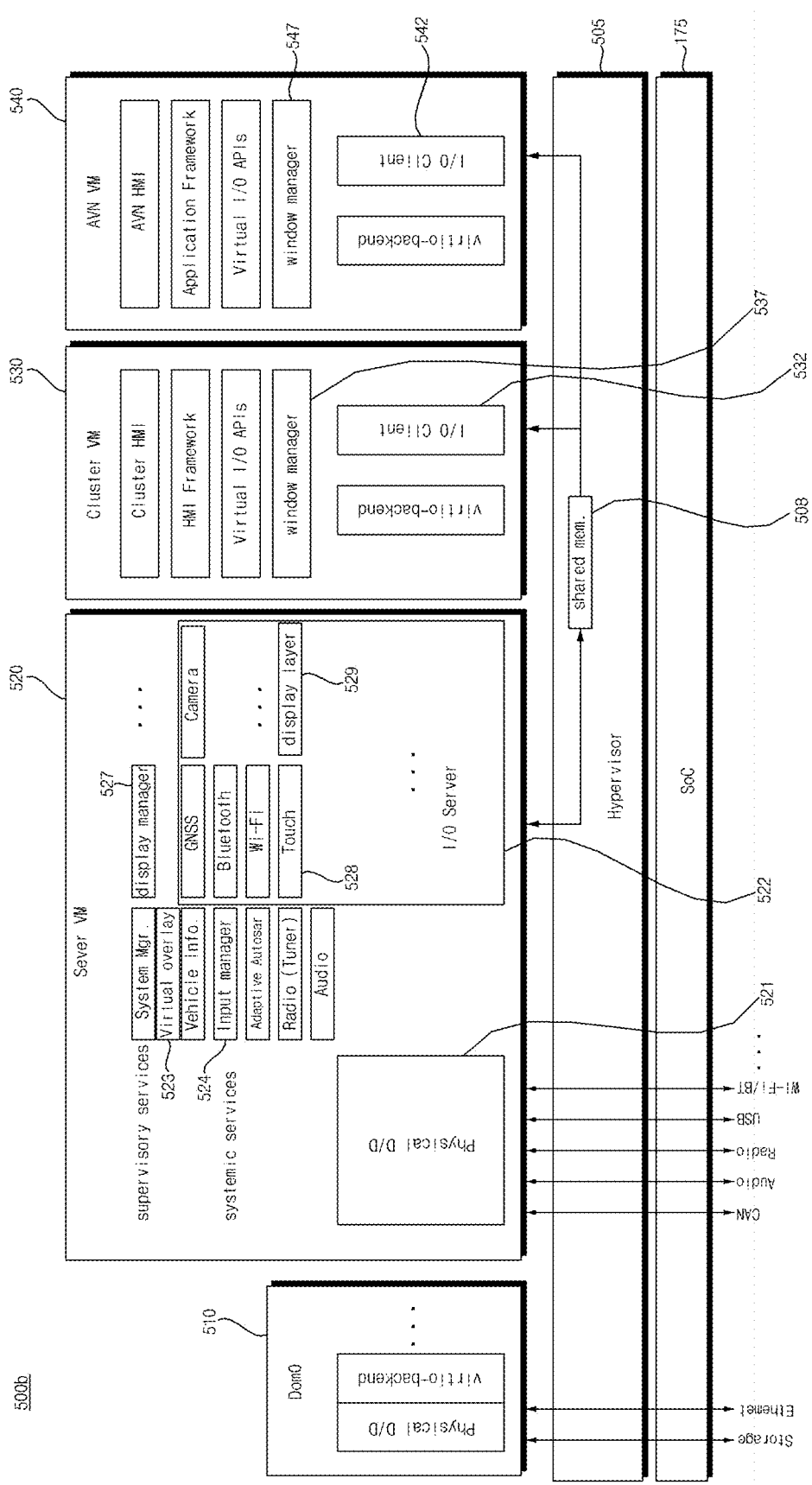
FIG. 6 is a diagram illustrating another example of a system executed in a signal processing device according to an embodiment of the present disclosure.

FIG. 6 is a diagram illustrating another example of a system executed in a signal processing device according to an embodiment of the present disclosure.

Referring to the figure, in the system 500b executed by the processor 175 in the signal processing device 170, the processor 175 in the signal processing device 170 executes the first to third virtual machines 520 to 540 on the hypervisor 505 in the processor 175, and the first virtual machine 520 in the processor 175 is configured to set the shared memory 508 based on the hypervisor 505 for transmission of data to the second and third virtual machines 530 and 540.

For example, information regarding touch input may be illustrated as the data. Consequently, the information regarding touch input may be transmitted to the second virtual machine 530 or the third virtual machine 540. Eventually, the touch input to the first display 180a or the second display 180b may be rapidly and accurately processed. In addition, the touch input may be rapidly and accurately processed even though the number of virtual machines that are executed is increased.

As another example, image data may be illustrated as the data. Consequently, an image may be displayed on the first display 180*a* or the second display 180*b*.

Meanwhile, in response to the same image data being shared in the shared memory 508, the plurality of displays 180*a* and 180*b* in the vehicle may display the same data in a synchronized state.

As another example, CAN communication data, audio data, radio data, USB data, wireless communication data, or position information data may be illustrated as the data. Consequently, information regarding the data may be displayed on the first display 180*a* or the second display 180*b*.

Meanwhile, although not shown in FIG. 6, the legacy virtual machine 510 may transmit memory data from the memory 140 or Ethernet data by Ethernet communication to the second and third virtual machines 530 and 540 using the shared memory 508 based on the hypervisor 505. Consequently, information corresponding to the memory data or the Ethernet data may be displayed on the first display 180*a* or the second display 180*b*.

Meanwhile, the first virtual machine 520 in the system 500*b* of FIG. 6 may include a display manager 527, a display layer server 529, a virtual overlay generator 523, an input manager 524, and a touch server 528, similarly to the first virtual machine in the system 500 of FIG. 5.

Meanwhile, the input and output server interface 522 in the first virtual machine 520 in the system 500*b* of FIG. 6 may include a display layer server 529 and a touch server 528, unlike FIG. 5.

The display manager 527, the display layer server 529, the input manager 524, the virtual overlay generator 523, and the touch server 528 operate in the same manner as in FIG. 5, such that a description thereof will be omitted.

Meanwhile, the first virtual machine 520 of FIG. 6 may further include a system manager for overall system control, a vehicle information manager for vehicle information management, an audio manager for audio control, and a radio manager for radio control.

Meanwhile, the input and output server interface 522 in the first virtual machine 520 in the system 500*b* of FIG. 6 may further include a GNSS server for GPS information input and output, a Bluetooth server for Bluetooth input and output, a Wi-Fi server for Wi-Fi input and output, and a camera server for camera data input and output.

Figure 7:
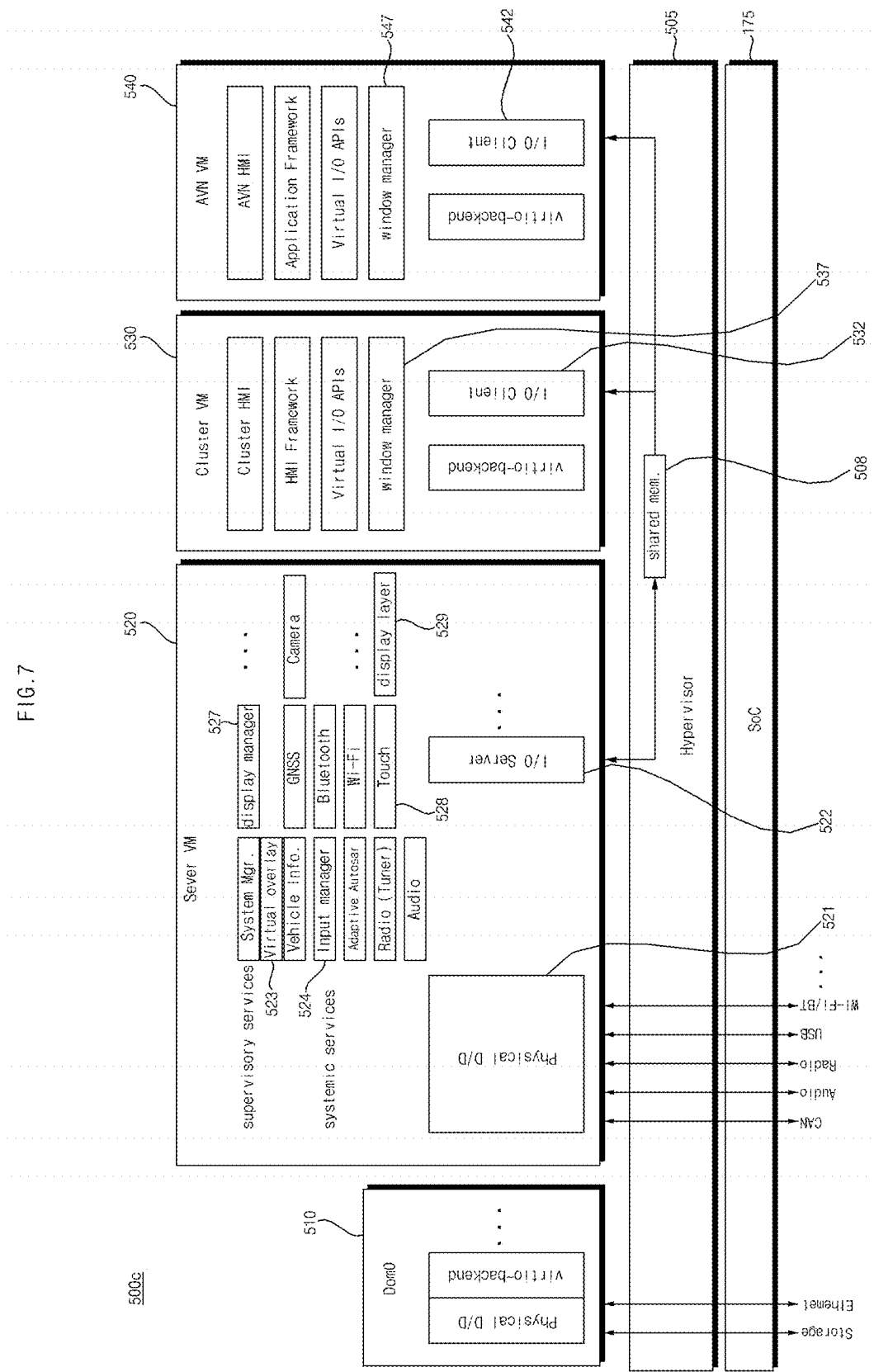
FIG. 7 is a diagram illustrating a further example of a system executed in a signal processing device according to an embodiment of the present disclosure.

FIG. 7 is a diagram illustrating a further example of a system executed in a signal processing device according to an embodiment of the present disclosure.

Referring to the figure, the system 500*c* executed by the processor 175 in the signal processing device of FIG. 7 is similar to the system 500*b* of FIG. 6.

That is, like FIG. 6, the processor 175 of FIG. 7 executes the first to third virtual machines 520 to 540 on the hypervisor 505 in the processor 175.

In FIG. 7, however, the display layer server 529 and the touch server 528 may be provided and executed in the first virtual machine 520 outside the input and output server interface 522, unlike FIG. 6.

In addition, the GNSS server for GPS information input and output, the Bluetooth server for Bluetooth input and output, the Wi-Fi server for Wi-Fi input and output, and the camera server for camera data input and output may be provided and executed in the first virtual machine 520 outside the input and output server interface 522, unlike FIG. 6.

That is, the display manager 527, the display layer server 529, the virtual overlay generator 523, the input manager 524, and the touch server 528 may be provided and executed in the first virtual machine 520.

The display manager 527, the display layer server 529, the virtual overlay generator 523, the input manager 524, and the touch server 528 operate in the same manner as in FIG. 5, such that a description thereof will be omitted.

Figure 8:
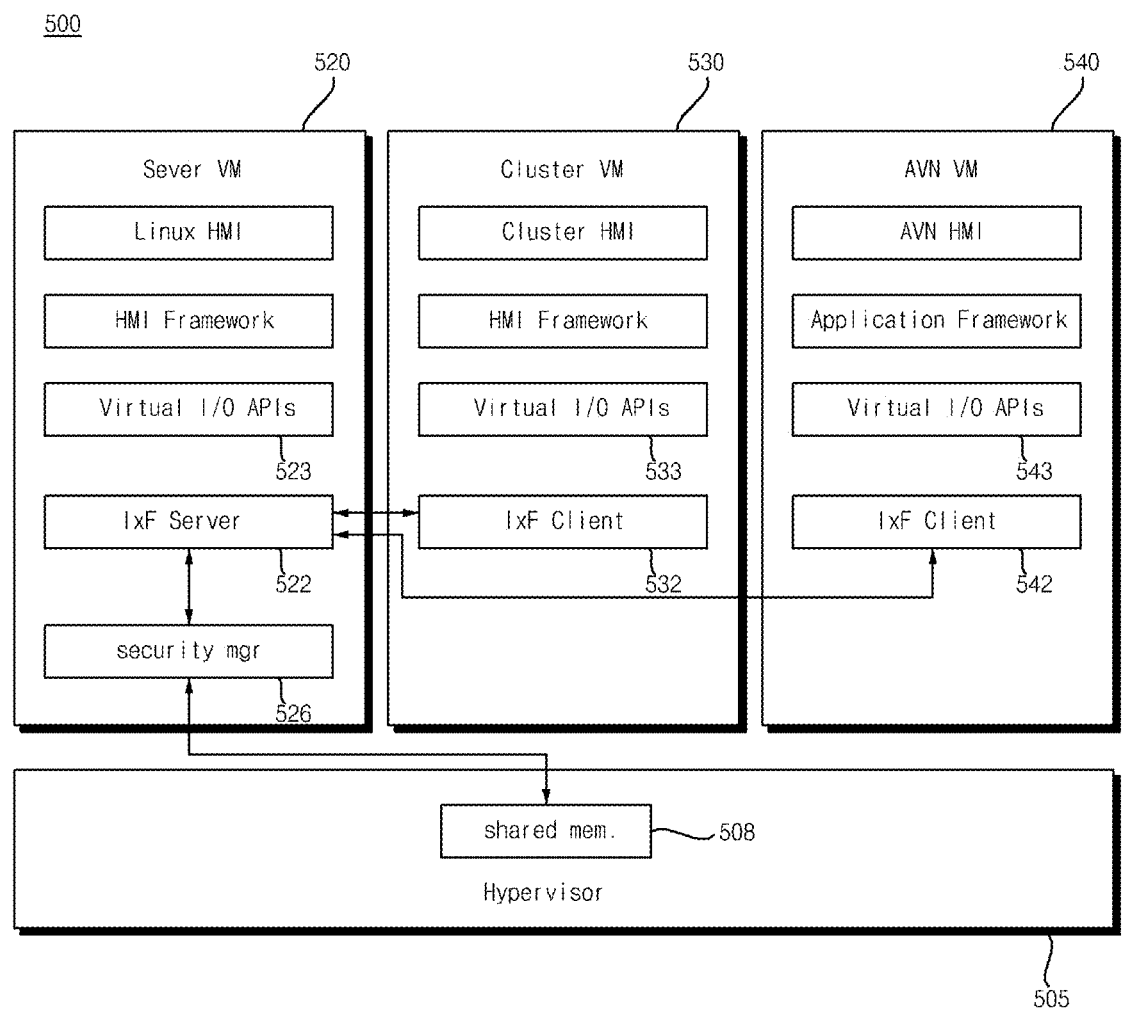
FIGS. 8 to 9B are diagrams referred to in the description of FIG. 5.

FIGS. 8 to 9B are diagrams referred to in the description of FIG. 5.

First, FIG. 8 illustrates that the first to third virtual machines 520 to 540 are executed on the hypervisor 505 in the processor 175 of the system 500 according to the present disclosure and that the first virtual machine 520 in the processor 175 is configured to set the shared memory 508 based on the hypervisor 505 in order to transmit the same data to the second virtual machine 530 and the third virtual machine 540.

Consequently, the plurality of displays 180*a* and 180*b* in the vehicle may display the same images in a synchronized state.

Meanwhile, high-speed data communication may be performed between the plurality of virtual machines. Furthermore, high-speed data communication may be performed even though the plurality of virtual machines is executed by different operating systems.

Meanwhile, the first virtual machine 520 in the processor 175 may not allocate memories corresponding in number to the virtual machines but may use a single shared memory 508, not memory allocation in response to transmitting the data processed by the first virtual machine 520 to another virtual machine. Consequently, 1:N data communication using the shared memory 508, not 1:1 data communication, may be performed between the virtual machines.

Meanwhile, the first virtual machine 520 in the processor 175 may include an input and output server interface 522 and a security manager 526.

Meanwhile, the second virtual machine 530 and the third virtual machine 540 may include input and output client interfaces 532 and 542, respectively. Consequently, high-speed data communication between the plurality of virtual machines may be performed using the input and output server interface 522 and the input and output client interfaces 532 and 542.

The input and output server interface 522 in the first virtual machine 520 may receive requests for transmission of the same data from the input and output client interfaces 532 and 542 in the second virtual machine 530 and the third virtual machine 540, and may transmit shared data to the shared memory 508 through the security manager 526 based thereon.

Figure 9A:
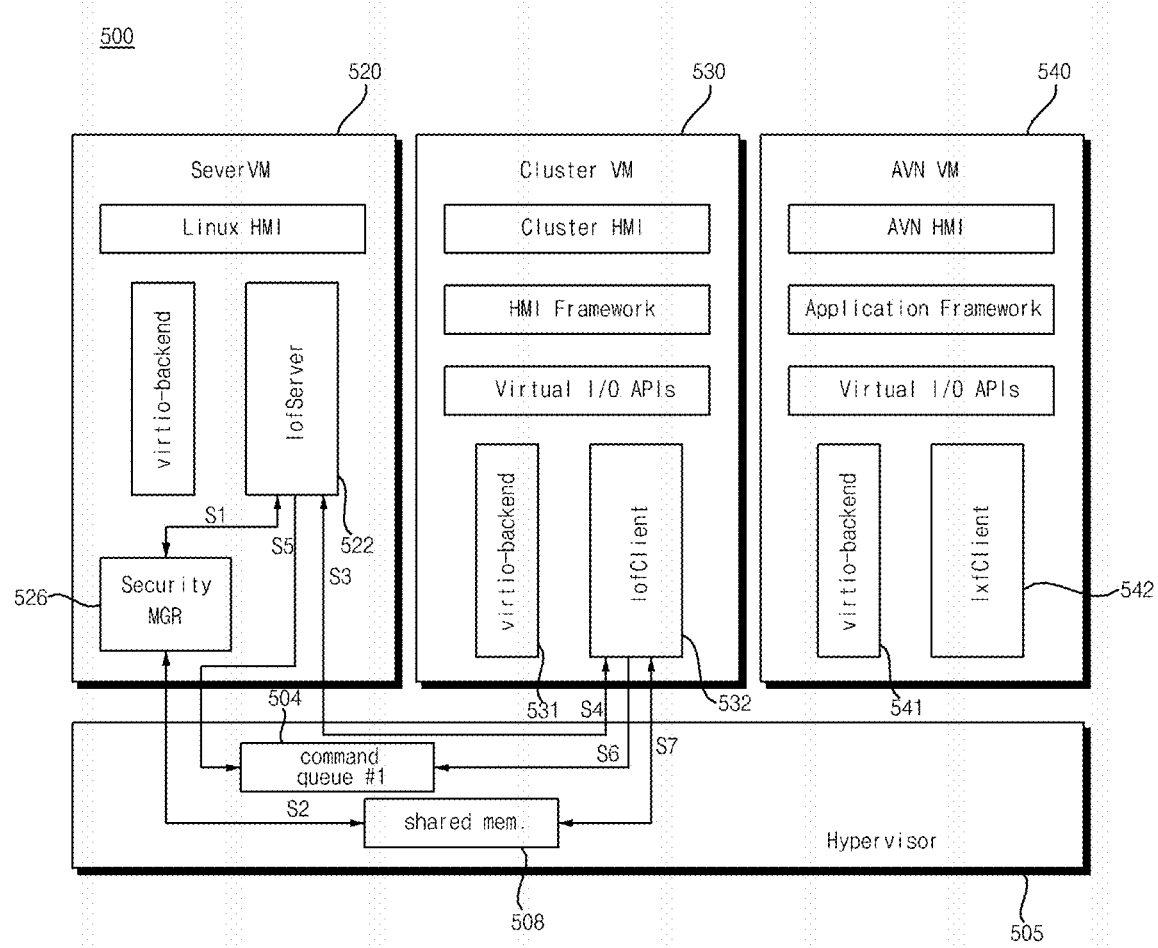

FIG. 9A is a view illustrating transmission of shared data in more detail.

Referring to the figure, in order to transmit shared data, the input and output server interface 522 in the first virtual machine 520 transmits a request for allocation of the shared memory 508 to the security manager 526 (S1).

Subsequently, the security manager 526 may allocate the shared memory 508 using the hypervisor 505 (S2), and may write shared data in the shared memory 508.

Meanwhile, the input and output client interfaces 532 and 542 may transmit a request for connection to the input and output server interface 522 after allocation of the shared memory 508 (S3).

Meanwhile, the input and output server interface 522 transmits information regarding shared memory 508 including key data to the input and output client interfaces 532 and 542 after allocation of the shared memory 508 (S4). At this time, the key data may be private key data for data access.

Meanwhile, the first virtual machine 520 in the processor 175 may transmit information regarding the shared memory 508 to the second virtual machine 530 and the third virtual machine 540 after setting of the shared memory 508.

Subsequently, the input and output server interface 522 in the first virtual machine 520 is configured to generate a command or a command queue for event processing, other than data, to control distributed processing between the virtual machines (S5).

The figure illustrates that a command queue is generated in a command queue buffer 504 in the hypervisor 505 under control of the input and output server interface 522. However, the present disclosure is not limited thereto, and the command queue may be generated in the first virtual machine 520, not the hypervisor 505, under control of the input and output server interface 522.

Subsequently, the input and output client interfaces 532 and 542 access the command queue buffer 504 to receive the generated command queue or information regarding the command queue (S6).

For example, in response to the commands transmitted to the input and output client interfaces 532 and 542 being the same, the generated command queues may be the same.

As another example, in response to the commands transmitted to the input and output client interfaces 532 and 542 being different from each other, different command queues may be transmitted to the input and output client interfaces 532 and 542.

Subsequently, the input and output client interfaces 532 and 542 may access the shared memory 508 based on the received key data (S5), and may copy or read the shared data from the shared memory 508 (S7).

Particularly, in response to the input and output client interfaces 532 and 542 receiving the same shared data, the input and output client interfaces 532 and 542 may access the shared memory 508 based on the same command queues and the same key data (S5), and may copy or read the shared data from the shared memory 508.

Consequently, the second virtual machine 530 and the third virtual machine 540 may access the shared memory 508, and may eventually share the shared data.

For example, in the case in which the shared data are image data, the second virtual machine 530 and the third virtual machine 540 may share the image data, and eventually the plurality of displays 180a and 180b in the vehicle may display the same shared images in a synchronized state.

FIG. 9B illustrates that, by the system 500 of FIG. 9A, the second virtual machine 530 displays image data received through the shared memory 508 on the first display 180a, and the third virtual machine 540 displays image data received through the shared memory 508 on the second display 180b.

FIG. 9B illustrates that an image 905a displayed on the first display 180a and an image 905b displayed on the second display 180b are synchronized, whereby the same images 905a and 905b are displayed at the time of T1.

That is, image data processed by the first virtual machine 520 in the processor 175 are transmitted to the second virtual machine 530 and the third virtual machine 540 through the shared memory 508, and the first image 905a displayed on the first display 180a and the second image 905b displayed on the second display 180b based on the image data may be the same. Consequently, the plurality of displays 180a and 180b in the vehicle may display the same images in a synchronized state.

Figure 10:
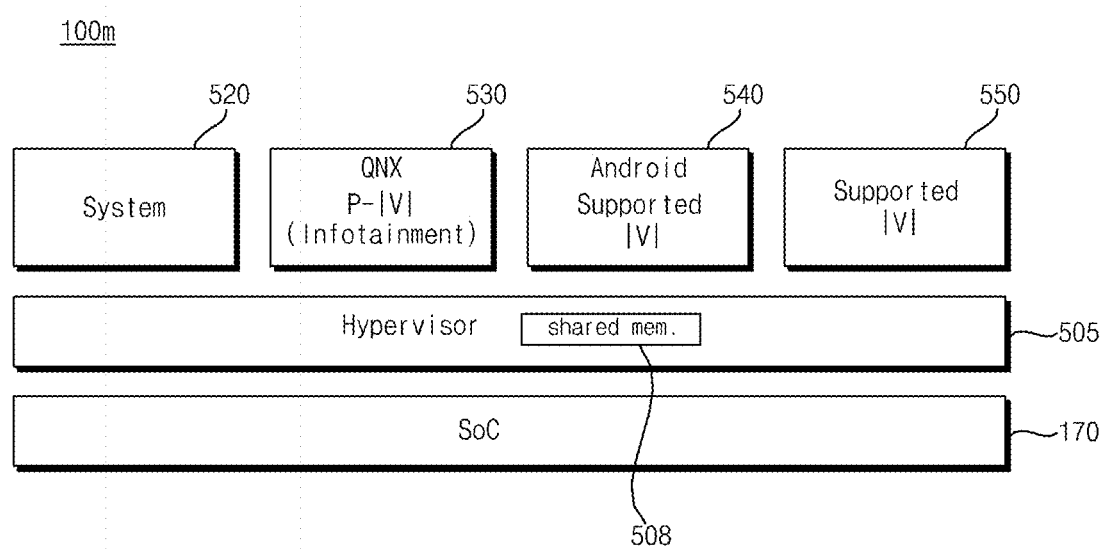
FIG. 10 is an exemplary internal block diagram of a vehicle display apparatus according to an embodiment of the present disclosure.

FIG. 10 is an exemplary internal block diagram of a vehicle display apparatus according to an embodiment of the present disclosure, and FIGS. 11 to 14C are diagrams referred to in the description of FIG. 10.

First, referring to FIG. 10, a vehicle display apparatus 100m according to an embodiment of the present disclosure includes a signal processing device 170.

The signal processing device 170 according to an embodiment of the present disclosure executes a hypervisor 505 in the processor 175, and executes a server virtual machine 520 and a plurality of guest virtual machines 530 to 550 on the hypervisor 505.

A first guest virtual machine 530 among the plurality of guest virtual machines 530 to 550 may operate for the first display 180a, a second guest virtual machine 540 may operate for the second display 180b, and a third guest virtual machine 550 may operate for the third display 180c.

The server virtual machine 520 may receive camera data from a plurality of camera devices 195 in the vehicle 200, and may process the input camera data and transmit the processed camera data to the shared memory 508 which is set based on the hypervisor 505.

For example, the server virtual machine 520 may perform filtering on the camera data to remove unnecessary data.

To this end, the server virtual machine 520 may execute a camera manager (not shown) and perform filtering on the camera data to remove unnecessary data.

Meanwhile, the server virtual machine 520 may further execute a monitoring manager (not shown) for driver state monitoring, an audio manager (not shown) for audio data processing, a power manger (not shown) for in-vehicle power management, and a signal manager (not shown) for vehicle signal management.

The first guest virtual machine 530 may execute an application service using the camera data. For example, the first guest virtual machine 530 may execute a navigation application.

Figure 12:
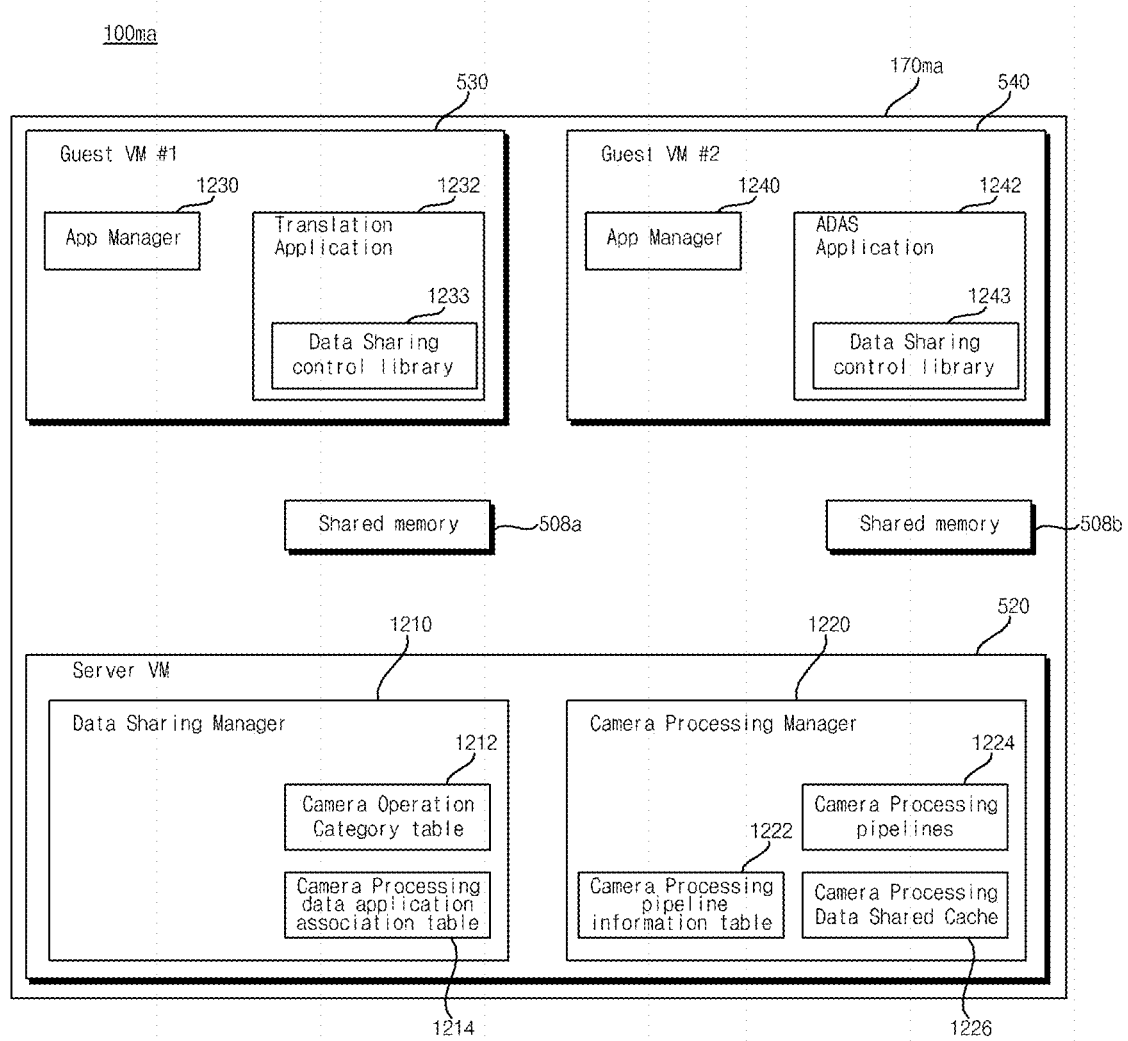

To this end, the first guest virtual machine 530 may execute an application manager 1230 (see FIG. 12).

Meanwhile, the first guest virtual machine 530 may further perform video or audio data processing, broadcasting data processing, voice processing, vehicle control, communication control, wireless connection with a mobile terminal, and the like.

Meanwhile, while executing an application service, the first guest virtual machine 530 may be connected to the shared memory 508 to receive the camera data stored in the shared memory 508.

In addition, the first guest virtual machine 530 may execute a navigation application based on the camera data received from the shared memory 508, and may control an image, corresponding to the navigation application, on the first display 180a.

Figure 11:
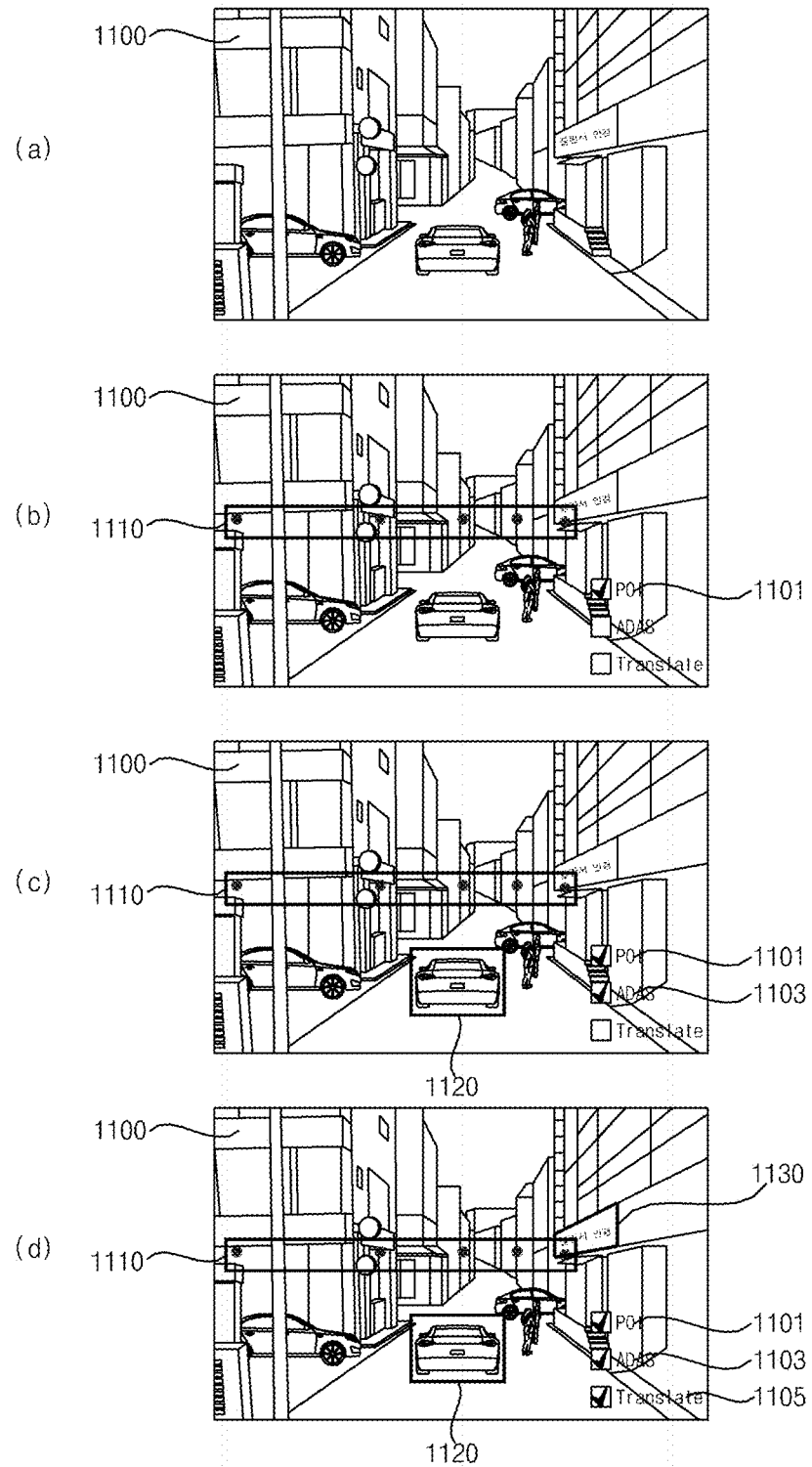

For example, a navigation screen 1100 corresponding to the navigation application may be displayed on the first display 180 as illustrated in (a) of FIG. 11.

The second guest virtual machine 540 may execute a first application service using the camera data. For example, the second guest virtual machine 540 may execute a location-based application such as a Point of Interest (POI).

To this end, the second guest virtual machine 540 may execute an application manager 1240 (see FIG. 12).

Meanwhile, the second guest virtual machine 540 may further execute an on-demand application, a connected service, a translation service, and the like.

Meanwhile, while executing the first application service, the second guest virtual machine 540 may be connected to the shared memory 508 to receive the camera data stored in the shared memory 508, may generate first data for the first application service based on the camera data, and may transmit the first data to the shared memory 508.

In response thereto, the first guest virtual machine 530 may control an image, synthesized based on the camera data from the shared memory 508 and the first data, on the first display 180a. Accordingly, the navigation screen 1100 including POI information 1110 may be displayed on the first display 180a.

Meanwhile, while the first guest virtual machine 530 performs signal processing on the camera data for executing the navigation application, the second guest virtual machine 540 may process data for the first application service, e.g., a location-based service, to generate first data corresponding to the location-based service data, thereby efficiently performing data processing. Particularly, data processing may be performed rapidly. Accordingly, image data processing based on camera data may be performed efficiently.

Meanwhile, the first guest virtual machine 530 may operate for the first display 180a based on a first operating system, and the second guest virtual machine 540 may operate for the second display 180b based on a second operating system different from the first operating system.

For example, the first guest virtual machine 530 may operate on the QNX operating system, and the second guest virtual machine 540 may operate on the Android operating system.

As described above, even when operating on different operating systems, the plurality of guest virtual machines 530 and 540 may share camera data using the shared memory 508 and share data generated or processed based on the shared camera data by using the shared memory 508 again, thereby efficiently performing image data processing based on the camera data. Particularly, even when operating on different operating systems, the plurality of virtual machines may efficiently process image data based on the camera data.

Meanwhile, while an image generated by synthesizing the camera data and the first data is displayed on the first display 180a, the second guest virtual machine 540 may control a second image, synthesized based on the camera data from the shared memory 508 and the first data, on the second display 180b.

Accordingly, image data processing based on camera data may be performed efficiently. Particularly, the second image synthesized in the second guest virtual machine 540 may be displayed on the second display 180b. That is, as illustrated in (b) of FIG. 11, the navigation screen 1100 including the POI information 1110 may be displayed on the second display 180b.

Meanwhile, the first guest virtual machine 530 may transmit the first image, synthesized based on the camera data and the first data, to the shared memory 508.

Accordingly, while the image, synthesized based on the camera data and the first data, is displayed on the first display 180a, the second guest virtual machine 540 may control the first image, received from the shared memory 508, on the second display 180b at the same time. Accordingly, as illustrated in (b) of FIG. 11, the navigation screen 1100 including the POI information 1110 may be displayed on the first display 180a and the second display 180b at the same time.

The third guest virtual machine 550 may execute a second application service using the camera data. For example, the third guest virtual machine 550 may execute ADAS and driver assistance application.

To this end, the third guest virtual machine 550 may execute an application manager (not shown).

Meanwhile, when executing a second application service, the third guest virtual machine 550 may be connected to the shared memory 508 to receive the camera data stored in the shared memory 508, and may generate second data for the second application service based on the camera data and transmit the second data to the shared memory 508.

In response thereto, the first guest virtual machine 530 may control an image, synthesized based on the camera data from the shared memory 508 and the second data, on the first display 180a. Accordingly, a navigation screen including ADAS information may be displayed on the first display 180a.

Alternatively, the first guest virtual machine 530 controls a third image, synthesized based on the camera data from the shared memory 508 and the first data and the second data, on the first display 180a. Accordingly, as illustrated in (c) of FIG. 11, the navigation screen 1100 including the POI information 1110 and ADAS information 1120 may be displayed on the first display 180a.

Accordingly, while the first guest virtual machine 530 performs signal processing on the camera data for executing the navigation application, the second guest virtual machine 540 may process data for an application service, e.g., a location-based service, to generate first data corresponding to the location-based service data, and the third guest virtual machine 550 may process data for a second application service, e.g., a driver assistance service, to generate second data corresponding to the driver assistance service data, thereby efficiently performing data processing. Accordingly, image data processing based on camera data may be performed efficiently.

Meanwhile, the first guest virtual machine 530 may operate for the first display 180a based on a first operating system, the second guest virtual machine 540 may operate for the second display 180b based on a second operating system different from the first operating system, and the third guest virtual machine 550 may operate for the third display 180c based on a third operating system different from the first operating system and the second operating system.

For example, the first guest virtual machine 530 may operate on the QNX operating system, the second guest virtual machine 540 may operate on the Android operating system, and the third guest virtual machine 550 may operate on the Linux operating system.

As described above, even when operating on different operating systems, the plurality of guest virtual machines 530, 540, and 550 may share camera data using the shared memory 508 and share data generated or processed based on the shared camera data by using the shared memory 508 again, thereby efficiently performing image data processing based on the camera data. Particularly, even when operating on different operating systems, the plurality of virtual machines may efficiently perform image data processing based on the camera data.

Meanwhile, while the image, synthesized based on the camera data and the first data, is displayed on the first display 180a, the second guest virtual machine 540 may control the second image, synthesized based on the camera data from the shared memory 508 and the first data, on the second display 180b, and the third guest virtual machine 550 may control a fourth image, synthesized based on the camera data from the shared memory 508 and the second data, on the third display 180c.

That is, as illustrated in (b) of FIG. 11, while the navigation screen 1100 including the POI information 1110 is displayed on the first display 180a and the second display 180b, the navigation screen 1100 including the ADAS information 1120 may be displayed on the third display 180c. Accordingly, the displays may display images corresponding to the respective displays while efficiently performing image data processing based on the camera data.

Meanwhile, while the image, synthesized based on the camera data and the first data, is displayed on the first display 180a, the second guest virtual machine 540 may control a fifth image, synthesized based on the camera data from the shared memory 508 and the first data and the second data, on the second display 180b, and the third guest virtual machine 550 may control a sixth image, synthesized based on the camera data from the shared memory 508 and the first data and the second data, on the third display 180c.

That is, as illustrated in (c) of FIG. 11, the navigation screen 1100 including the POI information 1110 and the ADAS information 1120 may be displayed on the first display 180a, the second display 180b, and the third display 180c. Accordingly, the respective displays 180a, 180b, and 180c may display the same image while efficiently performing image data processing based on the camera data.

Meanwhile, the first guest virtual machine 530 may transmit the synthesized third image to the shared memory 508, and at least one of the second guest virtual machine 540 or the third guest virtual machine 550 may be configured to display the synthesized third image from the shared memory 508 on at least one of the second display 180b or the third display 180c.

That is, as illustrated in (c) of FIG. 11, the navigation screen 1100 including the POI information 1110 and the ADAS information 1120 may be displayed on the first display 180a, the second display 180b, and the third display 180c. Accordingly, the respective displays 180a, 180b, and 180c may display the same image while efficiently performing image data processing based on the camera data.

FIG. 11 is a diagram illustrating various examples of a navigation screen.

Referring to FIG. 11, (a) of FIG. 11 illustrates a signal-processed navigation screen 1100 in response to executing a navigation application in the first guest virtual machine 530.

Meanwhile, if the second guest virtual machine 540 executes the first application for displaying POI information, the navigation screen 1100 including the POI information 1110 may be displayed on the first display 180a, as illustrated in (b) of FIG. 11.

In this case, a POI item 1101 may be highlighted among a plurality of items in the navigation screen 1100.

Meanwhile, if the third guest virtual machine 550 executes the second application for displaying ADAS information, the navigation screen 1100 including the POI information 1110 and the ADAS information 1120 may be displayed on the first display 180a, as illustrated in (c) of FIG. 11.

In this case, the POI item 1101 and an ADAS item 1103 may be highlighted among a plurality of items in the navigation screen 1100.

Meanwhile, if the second guest virtual machine 540 further executes a third application for displaying translation information, the second guest virtual machine 540 may generate third data for the third application service based on the camera data and transmit the third data to the shared memory 508.

In response thereto, the first guest virtual machine may control the navigation screen 1100, including the POI information 1110, the ADAS information 1120, and translation information 1130, on the first display 180a.

That is, as illustrated in (d) of FIG. 11, the navigation screen 1100 including the POI information 1110, the ADAS information 1120, and the translation information 1130 may be displayed on the first display 180a.

In this case, the POI item 1101, the ADAS item 1103, and the translation item 1105 may be highlighted among a plurality of items in the navigation screen 1100.

Meanwhile, unlike FIG. 11, it is also possible that the translation information 1130 is processed by the first guest virtual machine 530, and the POI information 1110 and the ADAS information 1120 are processed by the second guest virtual machine, which will be described below with reference to FIG. 12.

FIG. 12 is an exemplary internal block diagram of a signal processing device according to an embodiment of the present disclosure.

Referring to FIG. 12, a signal processing device 170ma according to an embodiment of the present disclosure may include a processor 175 configured to execute the server virtual machine 520 and the plurality of guest virtual machines 530 and 540, and shared memories 508a and 508b.

The first guest virtual machine 530 among the plurality of guest virtual machines 530 and 540 may execute each of a navigation application (not shown) and a translation application 1232. The translation application 1232 may include a data sharing control library 1233.

The first guest virtual machine 530 may execute an application manager 1230 for executing the navigation application (not shown) and the translation application 1232.

The second guest virtual machine 540 among the plurality of guest virtual machines 530 and 540 may execute an ADAS application 1242. The ADAS application 1242 may include a data sharing control library 1243.

The second guest virtual machine 540 may execute the application manager 1240 for executing the ADAS application 1242.

Meanwhile, the application managers 1230 and 1240 in the first guest virtual machine 530 or the second guest virtual machine 540 may transmit an event request to the server virtual machine 520, and the server virtual machine 520 may control sharable camera data among the processed camera data to be transmitted to the shared memory 508 based on the even request.

Meanwhile, the server virtual machine 520 may process the camera data.

For example, the server virtual machine 520 may perform processing operations, such as object detection, picture stabilization, and the like.

Meanwhile, the server virtual machine 520 may execute a data sharing manager 1210 for sharing camera data, and a camera processing manger 1220 for processing camera data.

The data sharing manager 1210 may execute or include a Camera Operation Category table 1212 and a Camera processing data application association table 1214.

The Camera Operation Category table 1212 may be a table in which camera data processing operations used in a camera application are classified into operations and stored.

By using this table 1212, commonly used camera data processing may be confirmed, and camera processing pipeline may be reconfigured based on the confirmation result.

The Camera processing data application association table 1214 may be a table for storing a state in which camera data is shared between applications or the camera data is commonly used.

The camera processing manager 1220 may execute a Camera processing pipeline information table 1222, a Camera processing pipeline 1224, and a Camera Processing Data Shared Cache 1226.

The Camera processing pipeline information table 1222 may be a table including information required for actual processing for each camera processing operation. By using this table, processing suitable for each stage of the pipeline may be performed.

The Camera processing pipeline 1224 operates for transmitting camera data.

When the processed camera data is shared between applications, the Camera Processing Data Shared Cache 1226 puts the processed data and notifies an application that has requested the data.

FIGS. 13A to 13E are diagrams referred to in the description of operation of FIG. 12.

For example, if the translation application 1232 is executed in the first guest virtual machine 530, the application manager 530 of the first guest virtual machine 530 transmits an event notification FLa to the server virtual machine 520.

Figure 13A:
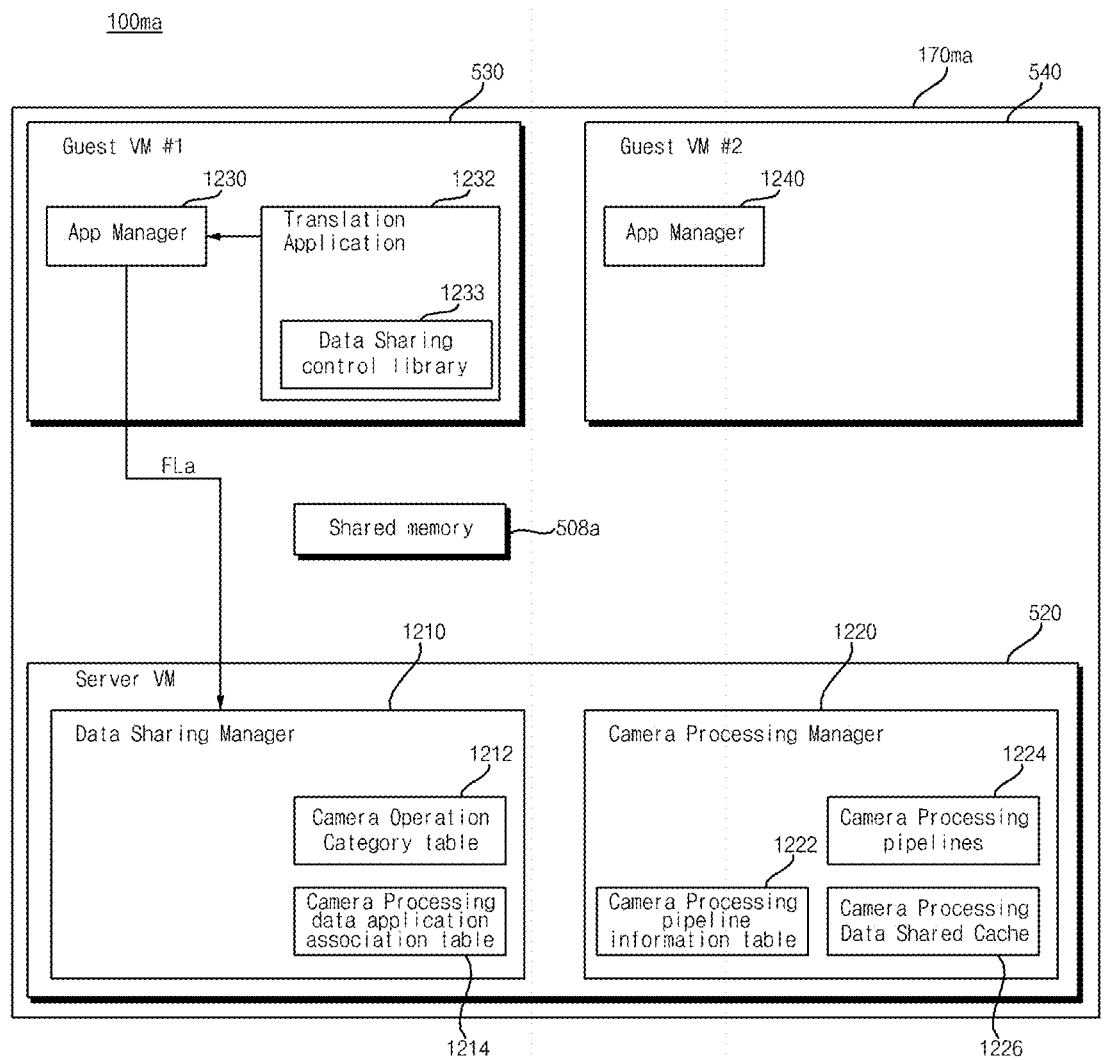
Figure 13B:
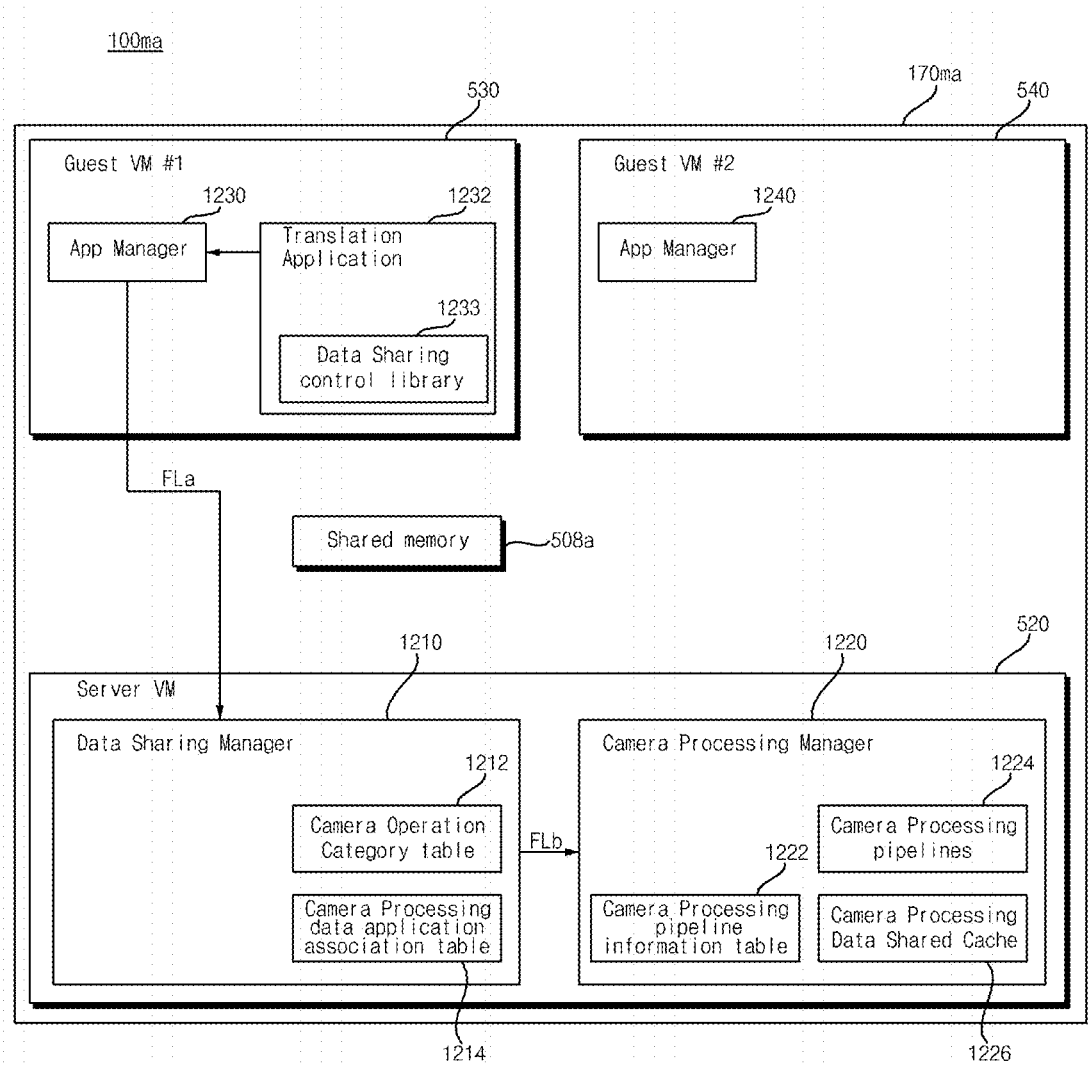

Then, the data sharing manager 1210 in the server virtual machine 520 checks whether camera data is sharable in the translation application 1232, and if camera data is sharable, the data sharing manager 1210 may transmit sharable information FLb to the camera processing manager 1220 as illustrated in FIG. 13B.

Figure 13C:
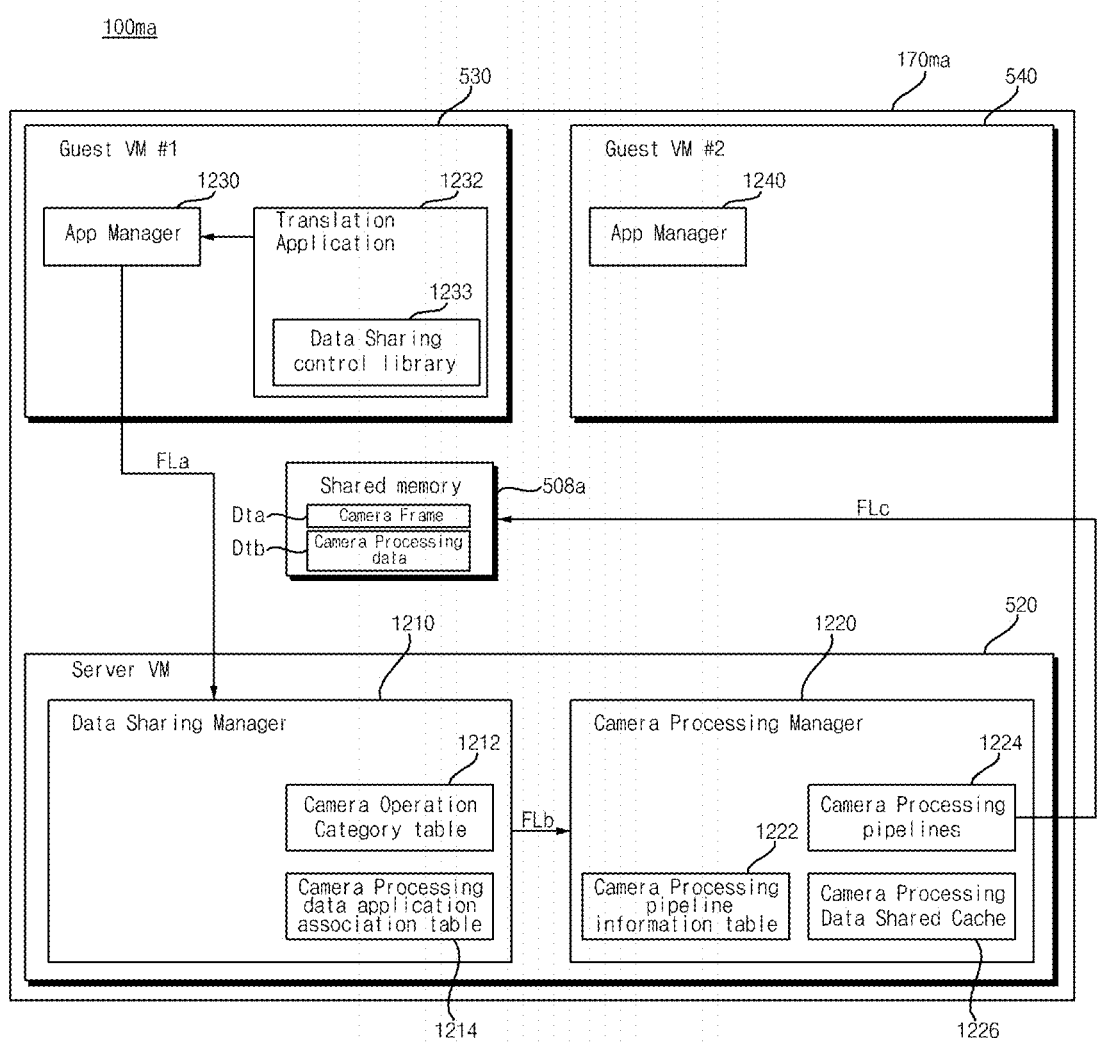
Figure 13D:
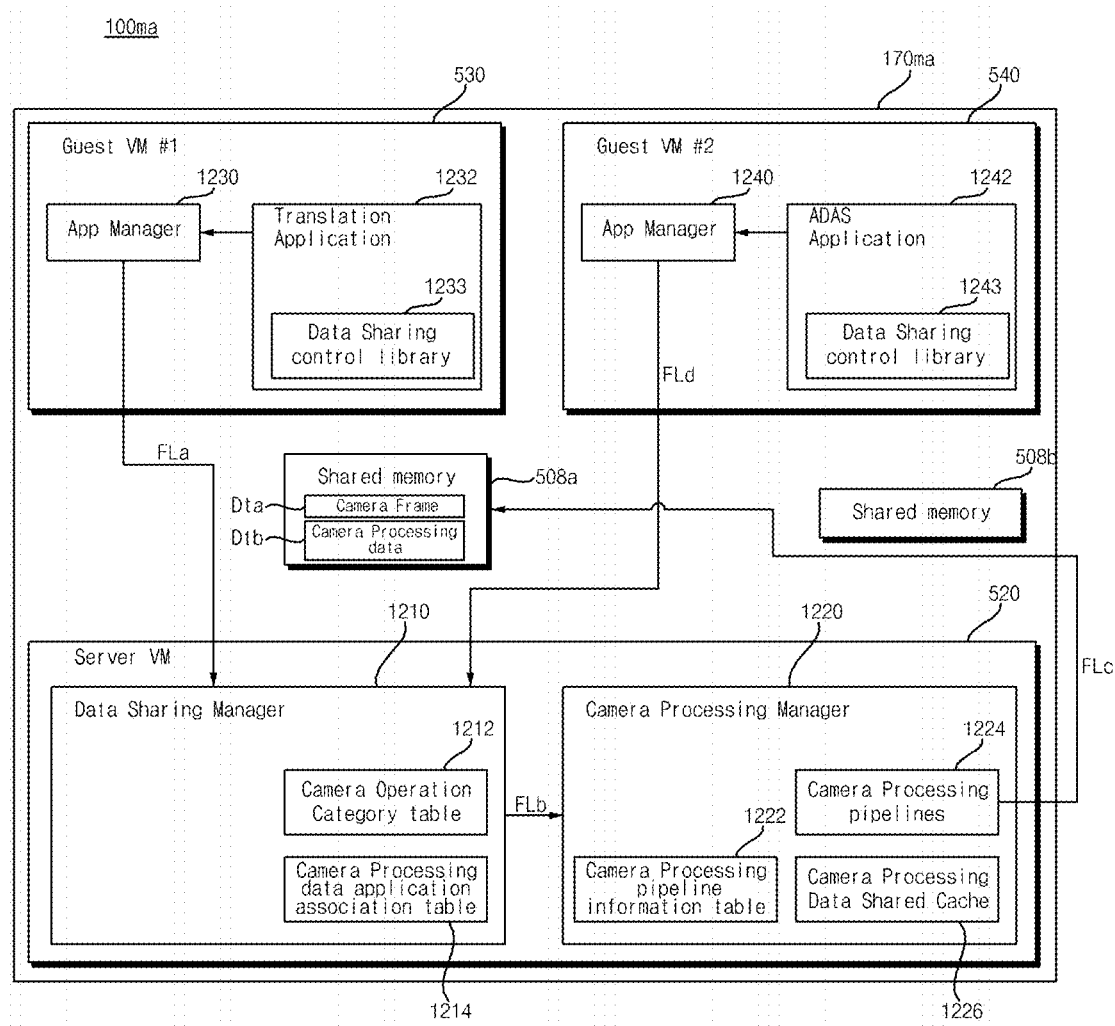

The Camera processing pipeline 1224 in the camera processing manager 1220 may write processed camera data FLc to the shared memory 508a based on the sharable information FLb, as illustrated in FIG. 13C.

The shared memory 508a may include a camera data frame Dta and camera processing data Dtb.

Meanwhile, the camera data FLc written to the shared memory 508a may be transmitted to the data sharing control library 1233 in the translation application 1232. Accordingly, camera data may be simply shared.

Meanwhile, the translation application 1232 in the first guest virtual machine 530 may be configured to perform data processing based on the received camera data, and to display the translation information 1130 in (d) of FIG. 11.

Then, if the ADAS application 1242 is executed in the second guest virtual machine 540, the application manager 530 of the first guest virtual machine 530 transmits a second event notification FLd to the server virtual machine 520.

Then, the data sharing manager 1210 in the server virtual machine 520 checks whether camera data is sharable in the ADAS application 1242, and if camera data is sharable, the data sharing manager 1210 may transmit sharable information to the camera processing manager 1220.

Figure 13E:
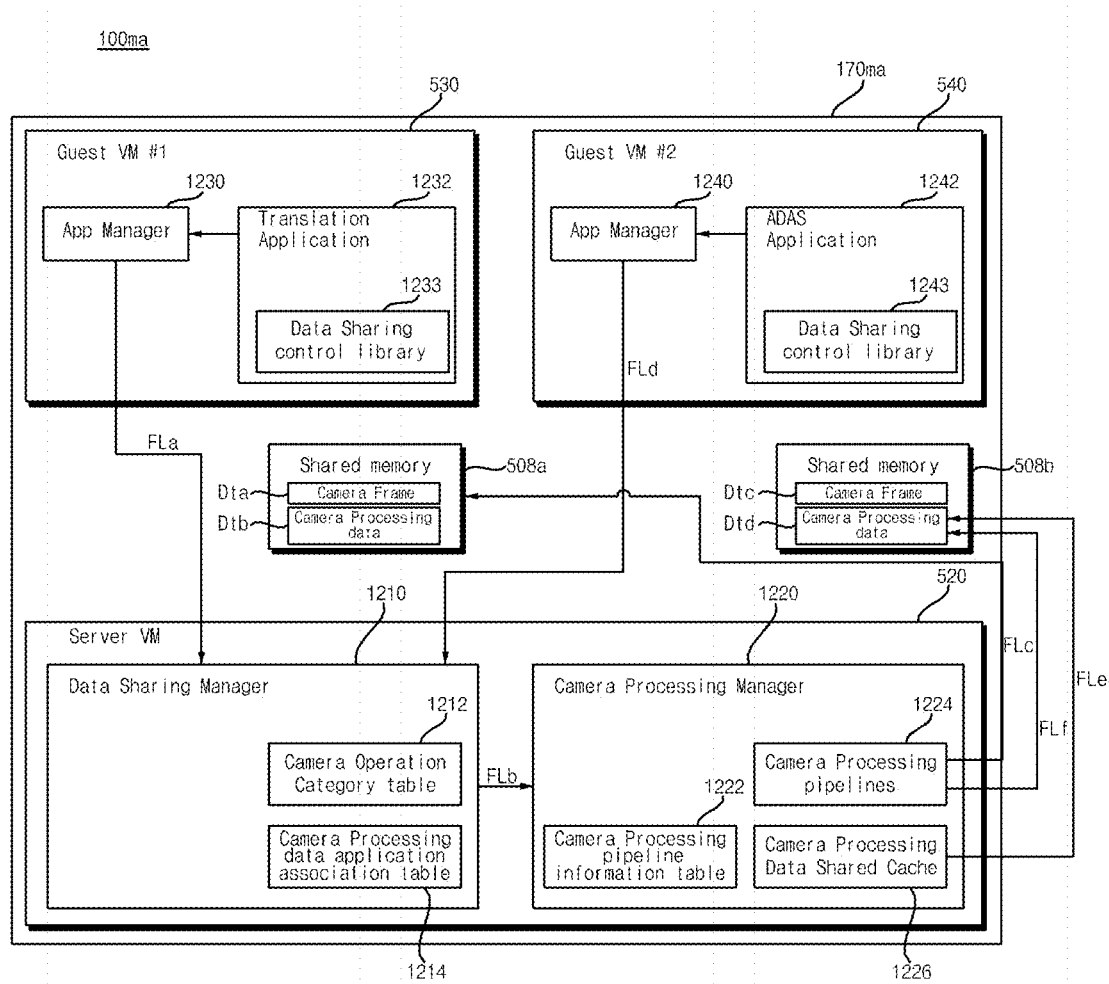

The Camera processing pipeline 1224 and the Camera Processing Data Shared Cache 1226 in the camera processing manager 1220 may write processed camera data FLe and FLf to the shared memory 508b based on the sharable information, as illustrated in FIG. 13E.

The shared memory 508b may include a camera data frame Dtac and camera processing data Dtd.

Meanwhile, the camera data FLe and FLf written to the shared memory 508a may be transmitted to the data sharing control library 1243 in the ADAS application 1242. Accordingly, camera data may be simply shared.

Meanwhile, the ADAS application 1242 in the second guest virtual machine 540 may be configured to perform data processing based on the received camera data, and to display the ADAS information 1120 in (c) of FIG. 11.

FIGS. 14A and 14B are diagrams illustrating various examples of a list of camera operation categories.

FIG. 14A is a diagram illustrating a list of applications related to object detection based on camera data.

Referring to FIG. 14A, the server virtual machine 520 may detect objects, such as roads, road lines, traffic signs, pedestrians, and the like.

The detected objects may be used in AR HUD applications, POI applications, Traffic Sign Recognition (TSR) applications, translation applications, ADAS applications, and the like.

FIG. 14B is a diagram illustrating a list of applications related to Picture Stabilization based on camera data.

Referring to FIG. 14B, the server virtual machine 520 may perform picture stabilization, and camera data on which picture stabilization is performed may be used for all image-related applications.

Figure 15A:
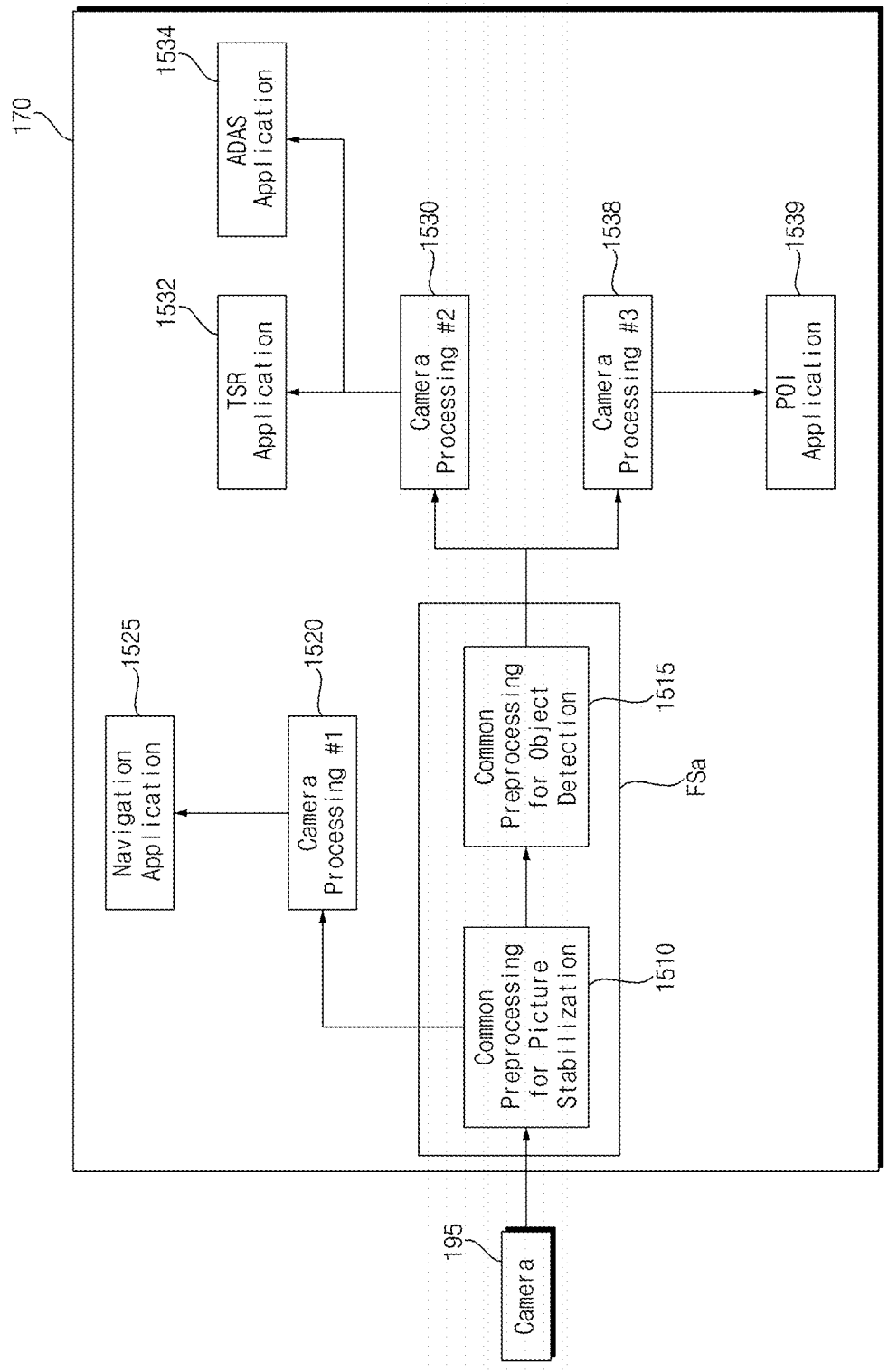
Figure 15B:
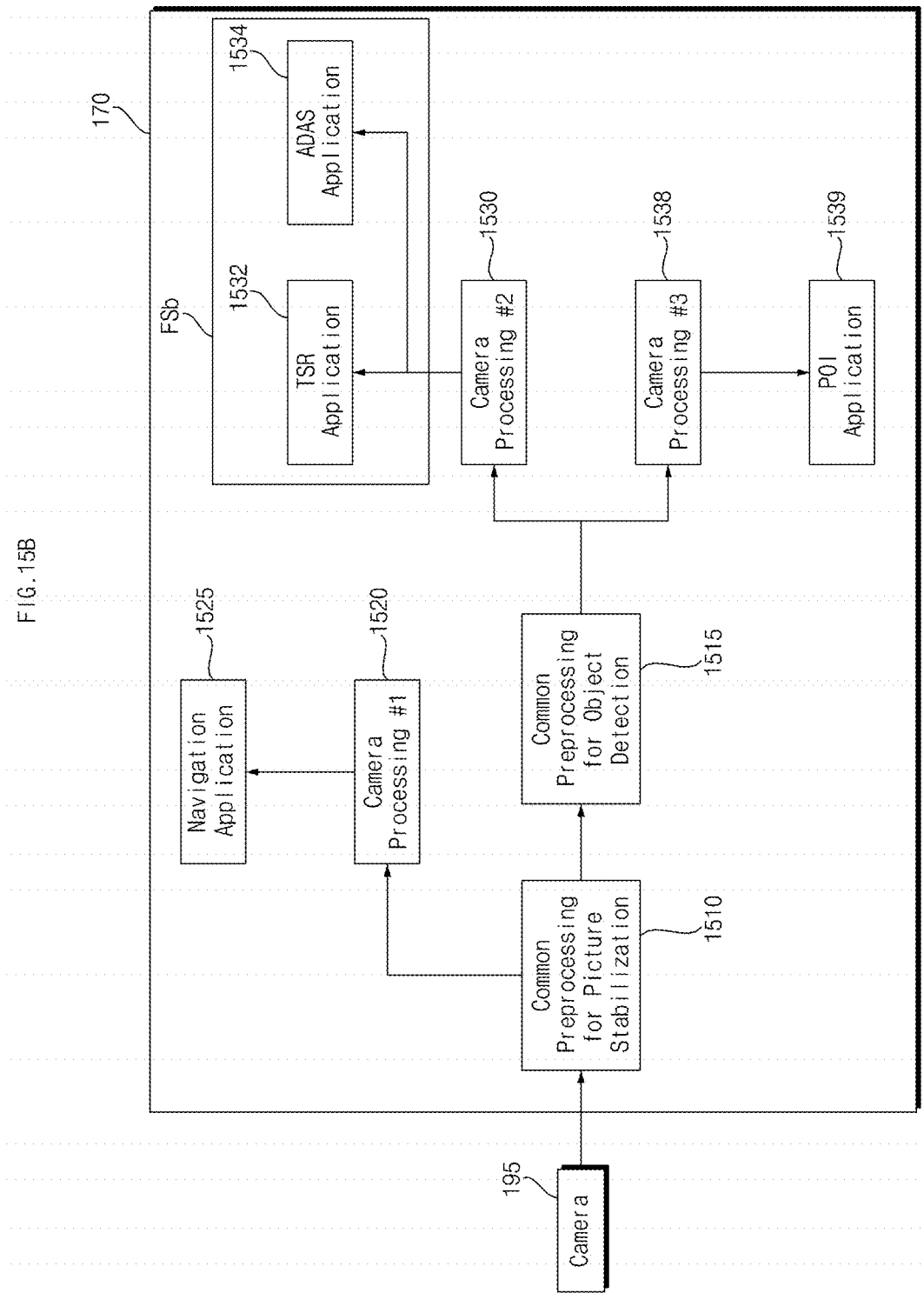
Figure 15C:
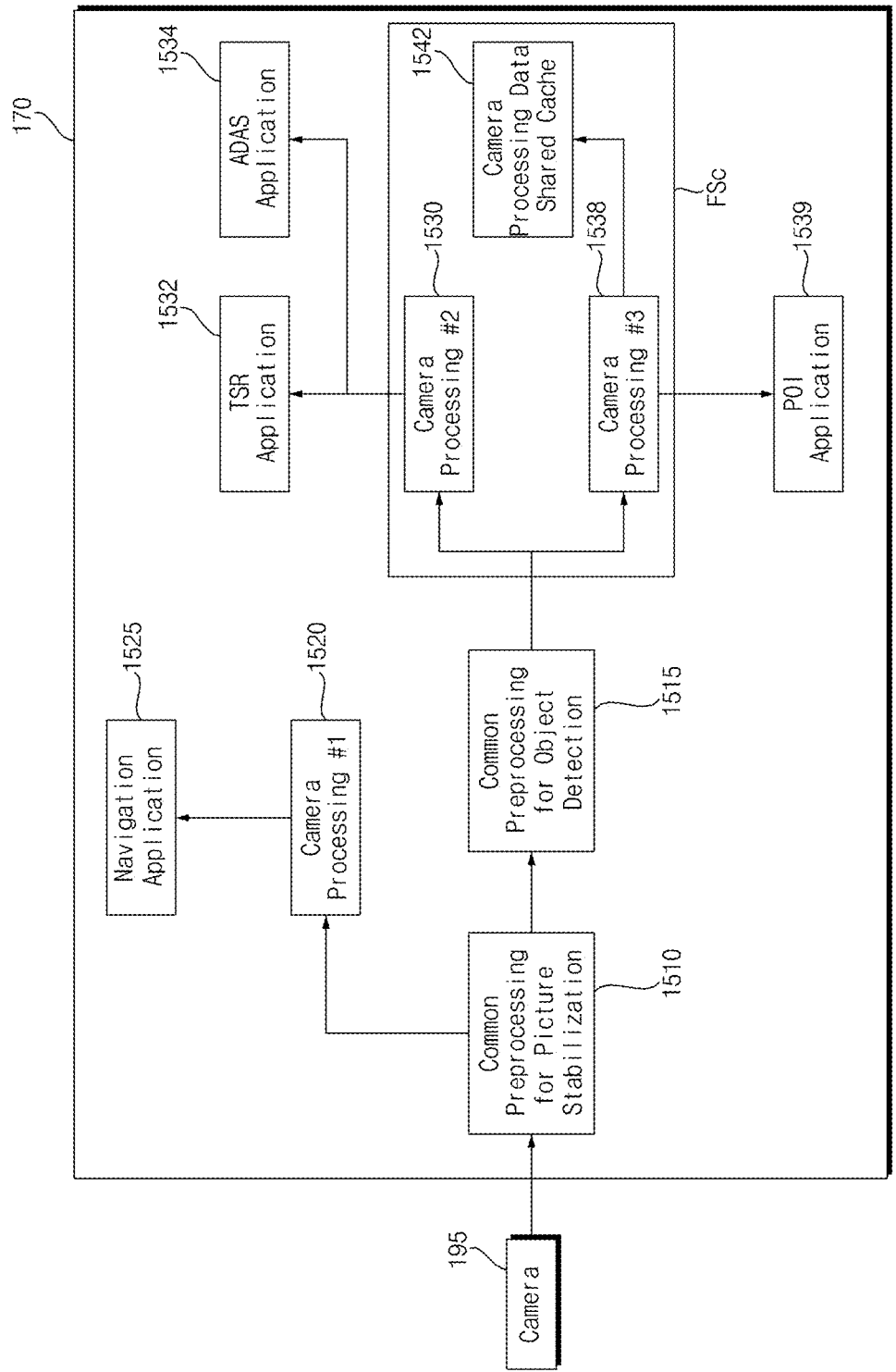

FIGS. 15A to 15C are an exemplary internal block diagram of the signal processing device 170 for explaining operation of FIG. 14A or FIG. 14B.

First, referring to FIG. 15A, the signal processing device 170 may execute or include an object detection processor 1515 for object detection from camera data, and a picture stabilization processor 1510 for picture stabilization from the camera data.

For example, the object detection processor 1515 and the picture stabilization processor 1510 may be executed in the server virtual machine 520.

That is, the server virtual machine 520 may perform object detection and picture stabilization by executing the object detection processor 1515 and the picture stabilization processor 1510, respectively, based on the camera data.

The first guest virtual machine 530 in the signal processing device 170 may execute a navigation application 1525, and may receive camera data, on which the picture stabilization is performed, via the shared memory 508.

Then, the first guest virtual machine 530 in the signal processing device 170 may execute the data processor 1520 to perform signal processing on the camera data on which the picture stabilization is performed, and may transmit the processed camera data to the navigation application 1525.

FIG. 15B is a diagram illustrating an example in which a TSR application and an ADAS application are executed in the signal processing device 170.

Referring to FIG. 15B, the second guest virtual machine 540 in the signal processing device 170 may execute a TSR application 1532 and an ADAS application 1534, and may receive a camera data, having a detected object, via the shared memory 508.

Then, the second guest virtual machine 540 in the signal processing device 170 may execute the data processor 1530 to perform signal processing on the camera data having the detected object, and may transmit the processed camera data, having the detected object, to the TSR application 1532 and the ADAS application 534.

FIG. 15C is a diagram illustrating an example in which a POI application is executed in the signal processing device 170.

Referring to FIG. 15C, the third guest virtual machine 540 in the signal processing device 170 executes a POI application 1539, and may receive camera data, in which an object is detected, via the shared memory 508.

Then, the third guest virtual machine 540 in the signal processing device 170 may execute the data processor 1538 to perform signal processing on the camera data in which an object is detected, and may transmit the processed camera data, having the detected object, to the POI application 1539.

Meanwhile, the camera data having the detected object and processed by the data processor 1538 may also be transmitted to the Camera Processing Data Shared Cache 1542 in the server virtual machine 520.

Referring to FIGS. 15A to 15C, the signal processing device 170 according to an embodiment of the present disclosure may perform common processing for applications using the same camera data, and then may perform separate processing operations for the respective applications.

Meanwhile, the signal processing device 170 according to an embodiment of the present disclosure may also share processing results if the same camera data is shared between other applications.

Meanwhile, the signal processing device 170 according to an embodiment of the present disclosure may share the camera data by using the Camera Processing Data Shared Cache 1542 and the shared memory 508 in response to a request for camera data used in the second application.

It will be apparent that, although the preferred embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. A signal processing device comprising a processor configured to perform signal processing for a plurality of displays located in a vehicle,
   wherein the processor is configured to execute a server virtual machine and a plurality of guest virtual machines on a hypervisor in the processor,
   wherein a first guest virtual machine and a second guest virtual machine among the plurality of guest virtual machines are configured to operate for a first display and a second display, respectively,
   wherein the server virtual machine is configured to perform picture stabilization based on input camera data, perform object detection based on a first camera data on which the picture stabilization is performed, and transmit the first camera data and a second camera data on which the object detection is performed to a shared memory set based on the hypervisor,
   wherein:
   the first guest virtual machine is configured to receive the first camera data from the shared memory and display an image corresponding to the first camera data,
   the second guest virtual machine is configured to receive the second camera data from the shared memory, to generate first data for a first application service based on the second camera data, and to transmit the first data to the shared memory; and
   the first guest virtual machine is configured to display an image, synthesized based on the first camera data and the first data from the shared memory, on the first display.

2. The signal processing device of claim 1, wherein the first guest virtual machine is configured to operate for the first display based on a first operating system, and the second guest virtual machine is configured to operate for the second display based on a second operating system different from the first operating system.

3. The signal processing device of claim 1, wherein the second guest virtual machine is configured to display a second image, synthesized based on the second camera data and the first data from the shared memory, on the second display.

4. The signal processing device of claim 1, wherein:
   the first guest virtual machine is configured to transmit the synthesized image to the shared memory; and
   the second guest virtual machine is configured to display the synthesized image from the shared memory on the second display.

5. The signal processing device of claim 1, wherein a third guest virtual machine among the plurality of guest virtual machines is configured to receive the second camera data from the shared memory, to generate second data for a second application service based on the second camera data, and to transmit the second data to the shared memory,
   wherein the first guest virtual machine is configured to display a third image, synthesized based on the first camera data, the first data, and the second data from the shared memory, on the first display.

6. The signal processing device of claim 5, wherein the first guest virtual machine is configured to operate for the first display based on a first operating system, and the second guest virtual machine is configured to operate for the second display based on a second operating system different from the first operating system, and the third guest virtual machine is configured to operate for the third display based on a third operating system different from the first operating system and the second operating system.

7. The signal processing device of claim 5, wherein:
   the second guest virtual machine is configured to display a second image, synthesized based on the second camera data and the first data from the shared memory, on the second display; and
   the third guest virtual machine is configured to display a fourth image, synthesized based on the second camera data and the second data from the shared memory, on the third display.

8. The signal processing device of claim 5, wherein:
   the second guest virtual machine is configured to display a fifth image, synthesized based on the second camera data, the first data, and the second data from the shared memory, on the second display; and
   the third guest virtual machine is configured to display a sixth image, synthesized based on the second camera data, the first data, and the second data from the shared memory, on the third display.

9. The signal processing device of claim 5, wherein the first guest virtual machine is configured to transmit the synthesized third image to the shared memory,
   wherein at least one of the second guest virtual machine or the third guest virtual machine is configured to display the synthesized third image from the shared memory on at least one of the second display or the third display.

10. The signal processing device of claim 1, wherein an application manager in the first guest virtual machine or the second guest virtual machine is configured to transmit an event request to the server virtual machine,
    wherein the server virtual machine is configured to transmit sharable first and second camera data among the processed camera data to the shared memory based on the event request.

11. The signal processing device of claim 10, wherein the server virtual machine is configured to execute a data sharing manager for sharing the first and second camera data and a camera processing manager for processing the first and second camera data.

12. A signal processing device comprising a processor configured to perform signal processing for at least one display located in a vehicle,
  wherein the processor is configured to execute a server virtual machine and first and second guest virtual machines that operate on different operating systems on a hypervisor in the processor,
  wherein a first guest virtual machine and a second guest virtual machine are configured to operate for a first display and a second display, respectively,
  wherein the server virtual machine is configured to process input data, generate a first shared data by processing the input data, generate a second shared data based on the first shared data, and transmit the first shared data and the second shared data to a shared memory set based on the hypervisor,
  wherein:
  the first guest virtual machine is configured to output content based on the first shared data from the shared memory, to the first display or an audio output device,
  the second guest virtual machine is configured to receive the second shared data from the shared memory, to generate first data for a first application service, and to transmit the first data to the shared memory; and
  the first guest virtual machine is configured to output content, synthesized based on the first shared data and the first data from the shared memory, to the first display or the audio output device.

13. The signal processing device of claim 12, wherein the first and second shared data comprises at least one of camera data, radar data, lidar data, audio data, or image data.

14. The signal processing device of claim 12, wherein the synthesized content comprises at least one of a synthesized image or a synthesized sound.

15. A vehicle display apparatus comprising:
  a plurality of displays; and
  a signal processing device comprising a processor configured to perform signal processing for the plurality of displays,
  wherein the signal processing device comprises a processor configured to perform signal processing for a plurality of displays located in a vehicle,
  wherein the processor is configured to execute a server virtual machine and a plurality of guest virtual machines on a hypervisor in the processor,
  wherein a first guest virtual machine and a second guest virtual machine among the plurality of guest virtual machines are configured to operate for a first display and a second display, respectively,
  wherein the server virtual machine is configured to perform picture stabilization based on input camera data, perform object detection based on a first camera data on which the picture stabilization is performed, and transmit the first camera data and a second camera data on which the object detection is performed to a shared memory set based on the hypervisor,
  wherein:
  the first guest virtual machine is configured to receive the first camera data from the shared memory and display an image corresponding to the first camera data,
  the second guest virtual machine is configured to receive the second camera data from the shared memory, to generate first data for a first application service based on the second camera data, and to transmit the first data to the shared memory; and
  the first guest virtual machine is configured to display an image, synthesized based on the first camera data and the first data from the shared memory, on the first display.

16. The vehicle display apparatus of claim 15, wherein the first guest virtual machine is configured to operate for the first display based on a first operating system, and the second guest virtual machine is configured to operate for the second display based on a second operating system different from the first operating system.

17. The vehicle display apparatus of claim 15, wherein the second guest virtual machine is configured to display a second image, synthesized based on the second camera data and the first data from the shared memory, on the second display.

18. The vehicle display apparatus of claim 15, wherein:
  the first guest virtual machine is configured to transmit the synthesized image to the shared memory; and
  the second guest virtual machine is configured to display the synthesized image from the shared memory on the second display.

19. The vehicle display apparatus of claim 15, wherein a third guest virtual machine among the plurality of guest virtual machines is configured to receive the second camera data from the shared memory, to generate second data for a second application service based on the second camera data, and to transmit the second data to the shared memory,
  wherein the first guest virtual machine is configured to display a third image, synthesized based on the first camera data, the first data, and the second data from the shared memory, on the first display.

20. The vehicle display apparatus of claim 19, wherein the first guest virtual machine is configured to operate for the first display based on a first operating system, and the second guest virtual machine is configured to operate for the second display based on a second operating system different from the first operating system, and the third guest virtual machine is configured to operate for the third display based on a third operating system different from the first operating system and the second operating system.

* * * * *